United States Patent Office

3,790,539
Patented Feb. 5, 1974

3,790,539
METHOD OF PRODUCING OF ALTERNATING COPOLYMERS OF CONJUGATED DIENES AND CONJUGATED POLAR VINYL MONOMERS
Akira Onishi and Koichi Irako, Kodaira, Yoshihiro Hayakawa, Higashi-Murayama, Takeshi Shimomura, Kobe, Takahiro Kawagoe, Tokorozawa, and Shoji Miyamoto, Higashi-Murayama, Japan, assignors to Bridgestone Tire Company Limited, Tokyo, Japan
Continuation of abandoned application Ser. No. 865,114, Oct. 9, 1969. This application Apr. 13, 1972, Ser. No. 243,898
Claims priority, application Japan, Oct. 14, 1968, 43/74,208; Oct. 16, 1968, 43/74,986; Oct. 18, 1968, 43/75,551; Oct. 22, 1968, 43/76,479; Feb. 8, 1969, 44/9,008; Feb. 13, 1969, 44/10,030; Mar. 7, 1969, 44/16,793
Int. Cl. C08d 1/14
U.S. Cl. 260—80.7      34 Claims

ABSTRACT OF THE DISCLOSURE

Alternating copolymers of a conjugated diene with a conjugated polar vinyl monomer, wherein the conjugated diene unit and the conjugated polar vinyl monomer unit are bonded substantially alternately, are produced by copolymerizing said conjugated diene with said conjugated polar vinyl monomer by means of a catalyst prepared in the presence of a conjugated polar vinyl monomer to be used in the copolymerization reaction from a component (A) of a compound of a transition metal of the Group IV or V in the Periodic Table and a component (B) selected from the group consisting of an aluminum-containing compound; a combination of an aluminum compound and a tin compound; a combination of an organometallic compound and a metal halide; and an organoaluminum compound. This copolymerization activity can be improved by adding a component (C) of a radical initiator selected from the group consisting of organic peroxides, organonitrile compounds and trialkylboron~oxygen systems to the above described components (A) and (B). Furthermore, the molecular weight of the alternating copolymers can be controlled by adding a molecular weight regulator selected from the group consisting of mercaptans, disulfides and carbon polyhalides containing bromine or iodine as an essential component to the polymerization reaction system.

This is a continuation of application Ser. No. 865,114, filed Oct. 9, 1969, now abandoned.

The present invention relates to a novel method of producing alternating copolymers of conjugated dienes with conjugated polar vinyl monomers.

The first aspect of this invention consists in a method of producing alternating copolymers of conjugated dienes and conjugated polar vinyl monomers, wherein the conjugated diene unit and the conjugated polar vinyl monomer unit are bonded substantially aternately, which comprises copolymerizing a monomer selected from conjugated dienes having 4 to 10 carbon atoms and a conjugated polar vinyl monomer selected from the group consisting of acrylonitrile, methacrylonitrile and $\alpha,\beta$-unsaturated carboxylic acid esters at a temperature of $-78°$ C. to $100°$ C. in liquid state in the presence of a catalyst prepared from A component (A): at least one transition metal compound selected from compounds of transition metals of the Groups IV and V in the Periodic Table; and A component (B): at least one component selected from the following Groups (B-1): an aluminum-containing component selected from the group consisting of aluminum compounds having the general formulae $$AlR_2X, Al_2R_3X_3, \text{ and } AlRX_2$$

and a combination of two or more aluminum compounds having the general formulae $$AlR_2X, Al_2R_3X_3, AlRX_2, AlR_3 \text{ and } AlX_3$$

wherein R represents a hydrocarbon radical selected from the group consisting of alkyl, cycloalkyl, aryl, alkaryl, and aralkyl radicals having 1 to 20 carbon atoms and X represents a halogen radical selected from the group consisting of F, Cl, Br and I radicals, in said aluminum-containing component a ratio $(d)$ of the total number of the hydrocarbon radicals to the total number of halogen radicals satisfying the following requirement $$0 < d \leq 2.0 \quad\quad\quad (1)$$

and R and X in the aluminum compounds constituting said component (B-1) may be same or different, (B-2): a combination of (B-2-a) at least one compound selected from the group consisting of aluminum compounds having the general formula $AlR_mX_{3-m}$ and (B-2-b) at least one compound selected from the group consisting of tin compounds having the general formula $SnR'_{m'}X_{4-m'}$, wherein R and R' represent a hydrocarbon radical having 1 to 20 carbon atoms, X represents a halogen radical, $m$ is a number selected from the group consisting of 1.5, 2.0 and 3.0 and $m'$ is a number selected from the group consisting of 0, 1, 2 and 3, (B-3): a combination of (B-3-a) at least one compound selected from the group consisting of organometallic compounds having the general formulae $$R_nM^I \text{ and } R_{n'-n''}M^{II}X_{n''}$$

and (B-3-b) at least one compound selected from the group consisting of metal halides having the general formula $$M^{III}X_p$$

wherein R represents a hydrocarbon radical having 1 to 20 carbon atoms, X represents a halogen radical, $M^I$ represents one metal selected from the group consisting of beryllium, magnesium, zinc, cadmium, mercury, boron, aluminum, and gallium, $M^{II}$ represents one metal selected from the group consisting of magnesium, cadmium, boron, aluminum, and gallium, $M^{III}$ represents one metal selected from the group consisting of beryllium, magnesium, calcium, zinc, cadmium, mercury, boron, aluminum, gallium, strontium and barium, $n$ represents the valence of $M^I$, $n'$ represents the valence of $M^{II}$, $n''$ represents the integer minor than $n'$ and $p$ represents the valence of $M^{III}$, all of $M^I$, $M^{II}$ and $M^{III}$ in the combination being not aluminum at the same time, and (B-4): an organoaluminum compound selected from the group consisting of aluminum compounds having the general formula $AlR_3$, wherein R represents a hydrocarbon radical having 1 to 10 carbon atoms, provided that in the case of the combination of the component (A) with the component (B-4), the component (A) is limited to vanadyl trichloride.

The second aspect of this invention consists in a method of producing alternating copolymers of conjugated dienes with conjugated polar vinyl monomers, in which the polymerization activity is improved by using three-component catalysts, wherein at least one radical initiator selected from the group consisting of organic peroxides, azonitrile compounds and trialkylboron-oxygen system as a component (C) is combined to the above described components (A) and (B), wherein (B) component is selected from (B–1), (B–2), (B–3) and (B–4).

Furthermore, the third aspect of this invention consists in a method for controlling the molecular weight of the alternating copolymers by adding at least one molecular weight regulator selected from the group consisting of mercaptans, disulfides and carbon polyhalides containing bromine or iodine as an essential component to the polymerization reaction system in the above first and second aspects of this invention.

In the catalyst system in the first aspect of the present invention, that is, in the catalyst system which is not combined with the component (C) and/or the molecular weight regulator, the combination of the component (A) and the component (B–1) has already been filed in another copending patent application, and therefore such a combination is excluded from the present invention.

Copolymers of a conjugated diene and a conjugated polar vinyl monomer have recently been used broadly for industrial materials, but they are mainly produced at present by an emulsion polymerization with the use of a radical initiator, and the resulting copolymers have random structures, in which monomer units are arranged randomly, corresponding to the used amounts and the ratio of the reactivities of each monomer.

Recently, the inventors have succeeded in selectively producing high molecular weight alternating copolymers of a conjugated diene and a conjugated vinyl monomer containing no gel in a high activity by using a catalyst prepared from an organoaluminum halide and a compound of transition metal of the Groups IV and V in the Periodic Table in the presence of conjugated polar vinyl monomer, and have filed a patent application in U.S.A. as No. 740,342 on June 26, 1968, and now abandoned.

Moreover, it has been found that the alternating copolymer obtained in the above method has a structure different from the conventional random copolymers and is more excellent in the physical properties than said conventional random copolymer.

For example, when the butadiene-acrylonitrile random copolymer and the butadiene-acrylonitrile alternating copolymer of the present invention having the same compositions are compared, the random copolymer is low in the tensile strength, and moreover the vulcanized composition is low in the tensile strength, resilience, and inferior in the heat resistance, solvent resistance, and strength at the swelling by a solvent, and has a large permanent compression set.

While, the alternating copolymer obtained in the present invention has a stereospecific property, wherein butadiene unit and acrylonitrile unit are bonded substantially alternately and butadiene unit is bonded in a high trans-1,4-structure, and therefore the copolymer causes stress-crystallization at the elongation and has a tensile strength considerably higher than the random copolymer. Moreover, the rubbery composition of the butadiene-acrylonitrile random copolymer of the present invention is extremely superior to the random copolymer in the heat resistance, solvent resistance, flexibility, resilience, strength at the swelling by a solvent, permanent compression set, etc.

This is due to the fact that butadiene-acrylonitrile copolymer produced in the present invention is a stereospecific alternating copolymer.

There have been disclosed methods of producing alternating copolymers of an olefin or a diene with a conjugated polar vinyl monomer, in one of which organoaluminum halides are used as a catalyst (M. Hirooka et al., J.P.S., B5, 47 (1967)), and in the other of which zinc chloride is used as one catalytic component (N. Gaylord et al., 155th ACS National Meeting (April 1969), Division of Industrial and Engineering Chemistry, 69). However, in these methods, yield of copolymer per an amount of the catalyst used is small and gel content in the resulting copolymer is high. Furthermore, the physical properties have not hitherto been known, and the commercial production has been impossible.

The catalyst system prepared from an organoaluminum halide and a compound of transition metal of the Groups IV and V in the Periodic Table, which has been found by the inventors, can produce alternating copolymers containing no gel in higher activity than the above-mentioned methods of M. Hirooka et al. and N. Gaylord et al.

The inventors have further investigated a method of producing alternating copolymers more effectively, which improves the efficiency of the catalyst and decreases the cost of the catalyst in order to produce the alternating copolymers commercially. As the result, the present invention has been accomplished.

The alternating copolymer of the present invention has a different structure from the random copolymer, and such an alternating copolymer can be formed only by a particular combination of the catalytic components, under a particular condition for preparing catalyst, for example, in the presence of a conjugated vinyl monomer, and under a particular polymerization condition.

For example, a catalyst system prepared from an organoaluminum compound and a compound of transition metal of the Groups IV and V in the Periodic Table is generally called as a Ziegler-Natta type catalyst, and often used in the polymerization of olefins, dienes and vinyl compounds. In this catalyst system, both the catalytic components are reacted in the absence of a monomer to prepare the catalyst, and then the resulting catalyst is used as such, or the resulting catalyst is further aged in order to increase the catalytic activity, and then used. However, even when the same catalytic components as those of the present invention are used, if the catalyst is prepared in the above procedure, the resulting catalyst is not suitable for the production of alternating copolymers. Because, the catalytic activity considerably lowers or homopolymers are formed. For example, a copolymerization of an olefin or a diolefin with a vinyl monomer by using the above-mentioned Ziegler-Natta type catalyst is disclosed in U.S. Pat. No. 3,365,432 (Cabot Corporation). In this patent, a transition metal is supported on solid carriers, such as $SiO_2$, $Al_2O_3$, etc. and reacted with organometals, such as trialkylaluminum, etc. to prepare a catalyst, and the resulting catalyst is used for the copolymerization reaction. However, the U.S. Pat. No. 3,365,432 is entirely different from the present invention. For example, in the combination of trialkyl-aluminum and vanadyl trichloride, which is one of the catalyst systems of the present invention, the catalyst is effective for the production of alternating copolymers only when the catalyst is prepared by a particular method and under a particular molar ratio of catalytic components as shown in Example 87 and Comparative Examples 13–15.

The mechanism of the alternating copolymerization reaction of the present invention has not been clarified completely, but according to the kinetic investigation of the copolymerization reaction up to present, the growth of the polymer chain proceeds radically and does not proceed in a coordinate ion type mechanism as explained in the copolymerization by a Ziegler-Natta type catalyst, and the growth in the catalyst of the present invention is entirely different from that of the Ziegler-Natta type catalyst.

The first merit of the present invention consists in that by using various catalytic components other than expensive organoaluminum halides, for example, metal halides, the copolymerization reaction of a conjugated diene and a conjugated polar vinyl monomer can be carried out more effectively, and high molecular weight alternating copolymers containing no gel can be obtained.

The second merit of this invention consists in that the catalytic activity can be improved while keeping the degree of alternation of the resulting copolymers sufficiently high by combining a radical initiator to the above catalytic components. The term "degree of alternation" used herein shows a ratio of respective monomer units bonded alternately in one polymer chain. Of course, synthesis of copolymers having various degrees of alternation may be effected corresponding to the purpose.

The third merit of this invention consists in that by adding at least one molecular weight regulator selected from the group consisting of mercaptans, disulfides and carbon polyhalides to the polymerization system in the above first and second aspects of this invention the molecular weight of the resulting copolymers can be controlled freely and the copolymerization reaction can be effected more easily.

The conjugated dienes to be used in the present invention are ones having 4 to 10 carbon atoms and the typical examples are butadiene-1,3, isoprene, pentadiene-1,3, hexadiene-1,3, 2,3-dimethyl-butadiene-1,3, and phenyl-butadiene-1,3. Among them, butadiene-1,3 and isoprene are preferable. Furthermore, B—B fraction containing butadiene-1,3 and isobutylene obtained by naphtha cracking process may be used.

The conjugated polar vinyl monomers to be used in the present invention include acrylonitrile, methacrylonitrile, and α,β-unsaturated carboxylic acid esters, for example, methyl acrylate, ethyl acrylate, propyl acrylate, butyl acrylate, methyl methacrylate, ethyl methacrylate, acrylonitrile, methacrylonitrile, and the like. Among them, methyl acrylate, methyl methacrylate and acrylonitrile are preferable.

As combinations of monomers, mention may be made of butadiene/acrylonitrile, butadiene/methyl methacrylate, butadiene/methyl acrylate, butadiene/methacrylonitrile, isoprene/acrylonitrile, isoprene/methyl methacrylate, isoprene/methyl acrylate, butadiene/ethyl acrylate, pentadiene-1,3/acrylonitrile, pentadiene-1,3/methyl acrylate, etc. Furthermore, combinations of at least three monomers, such as, butadiene/acrylonitrile/butyl acrylate, butadiene/acrylonitrile/methyl methacrylate, butadiene/isoprene/acrylonitrile, etc., may be used. Any above-mentioned combinations can produce alternating copolymers composed of a conjugated diene and a conjugated polar vinyl monomer in a molar ratio of 1:1.

The proportion of the conjugated diene to the conjugated polar vinyl monomer to be used for the copolymerization reaction may be selected optionally, but it is usually within a range of 1/10–10/1 (molar ratio). The monomer feed ratio influences the yield, the degree of polymerization of the resulting copolymer and the like, so that the monomer feed ratio can be properly determined depending upon the purpose.

Means for feeding the monomers is optional.

The catalytic component (A) to be used in the method of the present invention is at least one compound selected from the group consisting of compounds of the transition metals of Groups IV and V in the Periodic Table. Among them, compounds soluble in the mixed monomer solution are suitable, and particularly compounds of Group V soluble in the mixed monomer solution are more preferable.

The most preferable one is vanadium compound soluble in the mixed monomer solution.

The compounds of the transition metals of the Groups IV and V in the Periodic Table to be used as the catalytic component (A) are not limited in the bonding form, and include halides, alcoholates, cyclopentadienyl compounds, acetylacetonates, amide compounds, etc. For example, mention may be made of vanadium tetrachloride, vanadium trichloride, vanadyl trichloride, vanadyl dichloride, dicyclopentadienyl vanadium dichloride, triethyl orthovanadate, di-n-butyl monochloro-orthovanadate, ethyl dichloro-orthovanadate, n-butyl dichloro-orthovanadate, n-hexyl dichloro-orthovanadate, cyclohexyl dichloro-orthovanadate, tris(p-chlorophenyl)orthovanadate, vanadyl diacetylacetonate, vanadium triacetylacetonate, vanadium tetrabromide, vanadium tetraiodide, vanadyl tribromide, vanadyl triiodide, dimethyl monobromo-orthovanadate, tert-butyl dichloro-orthovanadate, di-tert-butyl monochloro-orthovanadate, tri-tert-butyl orthovanadate, trimethyl orthovanadate, tripropyl orthovanadate, triisopropyl orthovanadate, tributyl orthovanadate, triisobutyl orthovanadate, tri-sec-butyl orthovanadate, triphenyl orthovanadate, triisopentyl orthovanadate, trihexyl orthovanadate, tri-2-ethylhexyl orthovanadate, tritolyl orthovanadate, triphenyl orthovanadate, tricyclohexyl orthovanadate, vanadyl naphthenate, vanadyl acetate, vanadyl octenate, vanadyl isooctenate, vanadyl oxalate, vanadium tetrachloride aluminum acetylacetonate adduct, dichloro vanadyl salicylate, tantalum pentachloride, penta-ethoxy tantalum, penta-isopropoxy tantalum, penta-isobutoxy tantalum, penta-sec-butoxy tantalum, penta-n-butoxy tantalum, triethoxy tantalum dichloride, tributoxy tantalum dichloride, tetra-n-butoxy zirconium, zirconium tetrachloride, dichlorooxyzirconium chloranilate, titanium tetrachloride, titanium trichloride, butoxy titanium trichloride, dibutyoxy titanium dichloride, tributoxy titanium chloride, tetramethoxy titanium, tetra-ethoxy titanium, tetra-propoxy titanium, tetra-isopropoxy titanium, tetra-butoxy titanium, tetra-isobutoxy titanium, tetra-sec-butoxy titanium, tetra-tert-butoxy titanium, tetra-pentoxy titanium, tetra-phenoxy titanium, titanium acetate, titanium oxalate, titanium tetra(dimethylamide), titanium tetra(diethylamide), titanium tetra(dibutylamide), titanium trichloride-aluminum chloride adduct, zirconium tetra(dimethylamide), zirconium tetra(diethylamide), zirconium tetra(dibutylamide, vanadium tetra(dimethylamide), vanadium tetra(diethylamide) tantalum tri(di-n-propylamino) monoethylimide, tantalum tri(diethylamino) monoethylimide, penta-tert-butoxyniobium, penta-isopropoxy niobium, niobium tetra-(diethylamide), niobium tetra(di-n-propylamide), niobium pentachloride, penta-methoxy niobium, penta-ethoxy niobium and the like, and combinations thereof.

Among them, compounds soluble in the mixed monomer solution, particularly, vanadium compounds are preferable. The preferable compounds include vanadyl trichloride, tri-tert-butyl orthovanadate, triethyl orthovanadate, di-tert-butyl monochloro-orthovanadate, tert-butyl-dichloro-orthovanadate, vanadium tetrachloride, tetra-n-butoxy titanium, tetra-isopropoxy titanium, di-n-butoxy titanium dichloride, tetra-ethoxy tantalum, tetra-n-butoxy zirconium, vanadyl acetate, vanadyl naphthenate, vanadyl oxalte, vanadyl octenate, vanadyl isooctenate, titanium tetrachloride, titanium acetate, and titanium oxalate and combinations thereof.

The catalytic component (B) to be used in the present invention is at least one component selected from the group consisting of (B–1), (B–2), (B–3) and (B–4).

Component (B–1) is an aluminum containing component selected from the group consisting of aluminum compounds having the general formulae

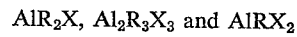

AlR$_2$X, Al$_2$R$_3$X$_3$ and AlRX$_2$ and a combination of two or more aluminum compounds having the general formulae

AlR$_2$X, Al$_2$R$_3$X$_3$, AlRX$_2$, AlR$_3$ and AlX$_3$ wherein R represents a hydrocarbon radical selected from the group consisting of alkyl, cycloalkyl, aryl, alkaryl, aralkyl radicals having 1 to 20 carbon atoms and X represents a halogen radical selected from the group consisting of F, Cl, Br and I radicals, in the above aluminum-containing component a ratio ($d$) of the total number of the hydrocarbon radicals to the total number of halogen radicals satisfying the following requirement $$0 < d \leq 2.0 \qquad (1)$$

and R and X in the aluminum compounds constituting the component (B–1) may be same or different.

Among the above general formulae, the compounds having the following formulae, AlRCl$_2$ and Al$_2$R$_3$Br$_3$, wherein R is an alkyl radical having 1 to 4 carbon atoms, are preferable.

Such catalytic component (B–1) includes organoaluminum halides and the combinations thereof, a combination of an organoaluminum halide with an aluminum halide, a combination of an organoaluminum with an aluminum halide and a multicombination combined further these combinations. The selection of these aluminum compounds and the ratio of these aluminum compounds to be combined are determined so as to satisfy the condition of said Forumla 1.

As these aluminum compounds, mention may be made of ethylaluminum dichloride, ethylaluminum sesquichloride, ethylaluminum sesquibromide, diethylaluminum chloride, methylaluminum dichloride, methylaluminum sesquichloride, isobutylaluminum dichloride, propylaluminum dichloride, propylaluminum sesquichloride, isobutylaluminum dibromide, propylaluminum sesquichloride, isobutylaluminum sesquichloride, aluminum trichloride, aluminum tribromide, trimethylaluminum, triethylaluminum, tripropylaluminum, tri-isobutylaluminum, tri-n-butylaluminum, dimethylaluminum chloride, diethylaluminum bromide, diisobutylaluminum chloride and the like.

The preferable catalytic component (B–1) is the aluminum-containing component, wherein the ratio (d) in the above Formula 1 satisfies the following requirement.

$$0.2 \leq d \leq 1.2$$

The preferred component (B–1) includes ethylaluminum dichloride, ethylaluminum dibromide, methylaluminum dichloride, ethylaluminum sesquichloride, methylaluminum sesquichloride, ethylaluminum sesquibromide, ethylaluminum dichloride/ethylaluminum sesquichloride, triethylaluminum/aluminum trichloride, diethylaluminum chloride/aluminum trichloride, etc.

Component (B–2) is a combination of (B–2–a) at least one compound selected from the group consisting of aluminum compounds having the general formula $AlR_mX_{3-m}$ and (B–2–b) at least one compound selected from the group consisting of tin compounds having the general formula $SnR'_{m'}X_{4-m'}$, wherein R and R' represent a hydrocarbon radical having 1 to 20 carbon atoms, X represents a halogen radical, m is a number selected from the group consisting of 1.5, 2.0 and 3.0 and m' is a number selected from the group consisting of 0, 1, 2 and 3.

Examples of organoaluminum compounds of the component (B–2–a) is trimethylaluminum, triethylaluminum, tri-n-propylaluminum, triisopropylaluminum, tri-n-butylaluminum, triisobutylaluminum, tri-sec-butylaluminum, trihexylaluminum, triisoprenylaluminum, trioctylaluminum, triphenylaluminum, tridodecylaluminum, tritolylaluminum, tribenzylaluminum, tricyclohexylaluminum, dimethylaluminum chloride, dimethylaluminum bromide, diethylaluminum chloride, diethylaluminum bromide, di-n-propylaluminum chloride, di-n-propylaluminum bromide, diisopropylaluminum chloride, diisopropylaluminum bromide, di-n-butylaluminum chloride, di-n-butylaluminum bromide, di-sec-butylaluminum chloride, di-sec-butylaluminum bromide, diisobutylaluminum chloride, diisobutylaluminum bromide, diphenylaluminum chloride, methylaluminum sesquichloride, methylaluminum sesquibromide, ethylaluminum sesquichloride, ethylaluminum sesquibromide and the like, and their iodine compounds.

Among them, trialkylaluminums and dialkylaluminum monohalides, such as trimethylaluminum, triethylaluminum, tri-n-propylaluminum, triisopropylaluminum, tri-n-butylaluminum, triisobutylaluminum, diethylaluminum chloride, etc. are preferable.

Among organoaluminum halides, organoaluminum dihalides, such as ethylaluminum dichloride, etc. when used together with the component (B–2–b), are low in the activity and not effective.

Examples of the component (B–2–b) are stannic chloride, stannic bromide, monomethyltin trichloride, monomethyltin tribromide, monoethyltin trichloride, monoethyltin tribromide, mono-n-propyltin trichloride, mono-n-propyltin tribromide, monoisopropyltin trichloride, mono-n-butyltin trichloride, mono-n-butyltin tribromide, phenyltin trichloride, phenyltin tribromide, dimethyltin dichloride, dimethyltin dibromide, diethyltin dichloride, diethyltin dibromide, diphenyltin dichloride, diphenyltin dibromide, trimethyltin chloride, trimethyltin bromide, triethyltin chloride, triethyltin bromide, tri-n-propyltin chloride, tri-n-propyltin bromide, tri-n-butyltin chloride, tri-n-butyltin bromide, triphenyltin chloride, triphenyltin bromide and the similar iodides.

Among them, stannic chloride, stannic bromide, monoethyltin trichloride, monoethyltin tribromide, triethyltin chloride, etc., are preferable.

The combination of the above components (B–2–a) and (B–2–b) can be selected optionally. Examples of most preferable combinations are trimethylaluminum∼stannic chloride, triethylaluminum∼stannic chloride, triisobutylaluminum∼stannic chloride, trimethylaluminum∼stannic bromide, triethylaluminum∼stannic bromide, triisobutylaluminum∼stannic bromide, diethylaluminum chloride∼stannic chloride, triethylaluminum∼monomethyltin trichloride, triethylaluminum∼triethyltin monochloride, etc. Other many combinations may also be effective.

Component (B–3) is a combination of (B–3–a) at least one compound selected from the group consisting of organometallic compounds having the general formula $$R_nM^I \text{ and } R_{n'-n''}M^{II}X_{n''}$$

and (B–3–b) at least one compound selected from the group consisting of metal halides having the general formula $$M^{III}X_p$$

wherein R represents a hydrocarbon radical having 1 to 20 carbon atoms, X represents a halogen radical, $M^I$ represents one metal selected from the group consisting of beryllium, magnesium, zinc, cadmium, mercury, boron, aluminum, and gallium, $M^{II}$ represents one metal selected from the group consisting of magnesium, cadmium, boron, aluminum and gallium, $M^{III}$ represents one metal selected from the group consisting of beryllium, magnesium, calcium, zinc, cadmium, mercury, boron, aluminum, gallium, strontium and barium, n represents the valence of $M^I$, n' represents the valence of $M^{II}$, n'' represents the integer minor than n' and p represents the valence of $M^{III}$. In this case, such a combination that $M^I$, $M^{II}$ and $M^{III}$ are all aluminum is excluded.

Examples of the component (B–3–a) are trimethylaluminum, triethylaluminum, tri-n-propylaluminum, triisopropylaluminum, triisobutylaluminum, tri-n-butylaluminum, tri-sec-butylaluminum, tri-n-hexylaluminum, tri-isopropenylaluminum, triphenylaluminm, ethylaluminum dichloride, ethylalminum sesquichloride, ethylaluminum sesquibromide, diethylaluminum chloride, methylaluminum dichloride, methylaluminum sesquichloride, propylaluminum dichloride, propylaluminum sesquichloride, methylaluminum dibromide, methylaluminum sesquibromide, isobutylaluminum dibromide, isobutylaluminum sesqichloride, dimethylaluminum chloride, dimethylaluminum bromide, diethylaluminum bromide, dipropylaluminum chloride, diisobutylaluminum chloride, diisobutylaluminum hydride, diethylaluminum hydride, dimethylaluminum hydride, diethylberyllium, dipropylberyllium, dimethylberyllium, diethylmagnesium, ethylmagnesium chloride, ethylmagnesium bromide, diethylzinc, dimethylzinc, dipropylzinc, dibutylzinc, diethylcadmium, dipropylcadmium, dibutylcadmium, dimethylcadmium, diethylmercury, dimethylmercury, dipropylmercury, dibutylmercury, trimethylboron, triethylboron, tributylboron, ethylboron dichloride, diethylboron chloride, diethylboron bromide, ethylboron sesquichloride, ethylboron dibromide, ethylboron sesquibromide, tripropylboron, triethylgallium, trimethylgallium and the like, and their combinations.

Examples of the component (B-3-b) are beryllium chloride, magnesium chloride, calcium chloride, zinc chloride, cadmium chloride, mercurous chloride, mercuric chloride, boron chloride, aluminum chloride, gallium chloride, strontium chloride, barium chloride, bromides and iodides of these metals, aluminum fluoride, boron fluoride, etc. Preferable component (B-3-b) are zinc chloride, zinc bromide, cadmium chloride, cadmium bromide, calcium chloride, mercuric chloride, boron fluoride, boron chloride, boron bromide, aluminum chloride, aluminum bromide, gallium chloride, etc. Among them, zinc chloride, zinc bromide, boron fluoride, boron chloride, boron bromide, aluminum chloride, aluminum bromide, calmium chloride, etc. are most preferable.

Preferable combinations of the components (B-3-a) and (B-3-b) are as follows. The combination of the component (B-3-a) with the component (B-3-b) is shown by a combination of the central metal atom in organometallic compounds of the Groups II and III in the Periodic Table with the central metal atom in metal halides of the Groups II and III in the Periodic Table in the order of the component (B-3-a) and the component (B-3-b). Preferable combinations are beryllium~aluminum, magnesium~aluminum, magnesium~boron, magnesium~zinc, aluminum~calcium, boron~calcium, zinc~calcium, beryllium~zinc, zinc~magnesium, zinc~zinc, zinc~cadmium, zinc~boron, zinc~aluminum, gallium~zinc, cadmium~zinc, cadmium~cadmium, cadmium~aluminum, zinc~mercury, aluminum~mercury, boron~boron, boron~zinc, cadmium~boron, boron~magnesium, beryllium~boron, boron~aluminum, aluminum~zinc, aluminum~boron, aluminum~cadmium, aluminum~beryllium, aluminum~magnesium, etc. Among them, most preferable combinations are beryllium~aluminum, magnesium~aluminum, aluminum~calcium, zinc~calcium, boron~calcium, beryllium~zinc, zinc~zinc, zinc~boron, zinc~aluminum, cadmium~cadmium, magnesium~zinc, cadmium~aluminum, aluminum~mercury, boron~boron, boron~aluminum, boron~zinc, aluminum~zinc, aluminum~boron, aluminum~cadmium, aluminum~magnesium, aluminum~beryllium, etc. When, two or more of compounds of each (B-3-a) and (B-3-b) are combined, the following combinations may be obtained, for example, aluminum~aluminum~zinc and aluminum~zinc~aluminum.

Component (B-4) is an organoaluminum compound having the general formula $AlR_3$, wherein R represents a hydrocarbon radical having 1 to 10 carbon atoms. The suitable organoaluminum compounds include trimethylaluminum, triethylaluminum, triisopropylaluminum, tri-n-propylaluminum, tri-n-butylaluminum, tri-sec-butylaluminum, triisobutylaluminum, tri-tert-butylaluminum, triisopropenylaluminum, tripentylaluminum, trihexylaluminum and the like.

The components (A) and (B) according to the invention may involve complexes obtained by complexing the components (A) and/or (B) with a suitable basic organic compound. The suitable basic organic compounds include organonitriles, such as acetonitrile, propionitrile, valeronitrile, fumaronitrile, acrylonitrile, methacrylonitrile, benzonitrile, etc.; organic carboxylic acid esters, such as ethyl acetate, ethyl propionate, ethyl butyrate, methyl acetate, methyl propionate, methyl butyrate, propyl acetate, methyl acrylate, ethyl acrylate, propyl acrylate, methyl methacrylate, ethyl methacrylate, propyl methacrylate, butyl methacrylate, methyl crotonate, ethyl crotonate, methyl benzoate, ethyl benzoate, methyl phthalate, ethyl terephthalate, ethyl isophthalate, butyl benzoate, methyl salicylate, ethyl salicylate, etc.; organic aldehydes, such as formaldehyde, acetoaldehyde, propionaldehyde, acrolein, benzaldehyde, etc.; organic acids, such as acetic acid, propionic acid, benzoic acid, salicyclic acid, etc.; organic ethers, such as ethyl ether, methyl ether, propyl ether, tetrahydrofuran, anisole, veratrol, ethylene glycol dimethyl ether, etc.; thioethers, such as ethyl thioether, methyl ethyl thioether, ethyl propyl thioether, propyl butyl tioether, thiophene, etc.; amines, such as, diphenylamine, phenyl-β-naphthylamine, trimethylamine, aniline, triphenylamine, dimethylaniline, methylamine, dimethylamine, indole, carbazole, etc.; pyridine and pyridine derivatives, such as picolines, β-collidine, quinoline, 2,4,6-collidine, etc.; phosphines, such as triphenylphosphine, trimethylphosphine, triethylphosphine, triisopropylphosphine, etc.; phosphites, such as triphenyl phosphite, dimethyl phosphite, diethyl phosphite, diisopropyl phosphite, diallyl phosphite, etc.; phosphates, such as trimethyl phosphate, triethyl phosphate, dilauryl phosphate, tris(butoxyethyl)phosphate, bis(2-ethylhexyl)phosphate, etc.; phosphonates, such as diisopropyl dimethylaminomethylphosphate, etc.; arsines, such as triphenylarsine, trimethylarsine, triethylarsine, triisopropylarsine, etc.; hexamethylphosphortriamide; carbon disulfide, polycyclic aromatic hydrocarbons, such as naphthalene, anthracene, phenanthrene, fluorene, etc.; and the like. Among them, acrylonitrile, methyl methacrylate, dimethylaniline, naphthalene, phenanthrene, fluorene and the like are most preferable.

It is not necessary that all components to be used in the components (A) and (B) of catalyst system of the present invention are complexed, but catalyst systems composed of non-complexed components and complexed components may be used. For example, the present invention includes a catalyst system prepared by adding an aluminum trichloride-acrylonitrile complex to a triethylaluminum~aluminum chloride~zinc chloride~vanadyl trichloride system.

The catalysts according to the invention consist of the components (A) and (B) and are usually prepared at a temperature of from $-100°$ C. to $100°$ C. For the order of preparing the catalysts, there are various manners, for example, the following orders for the preparation can be used, but the order is not limited thereto.

(1) To the component (A) are added a conjugated polar vinyl monomer and a conjugated diene in this order or a reverse order. The resulting mixture is aged at $-78°$ C.~$+60°$ C. within such an extent that polymerization does not occur, and finally the component (B) is added to the aged system.

(2) the component (B) and a conjugated polar vinyl monomer are mixed and the resulting mixture is aged at $-78°$ C.~$+60°$ C. within such an extent that polymerization does not occur. Then to the aged system are added a conjugated diene and the component (A) in this order or in a reverse order.

(3) The component (A) and the component (B) are mixed in the presence of a conjugated diene and a conjugated polar vinyl monomer.

In all the above cases, it is preferable that the component (A) is contacted with the component (B) at least in the presence of a conjugated polar vinyl monomer.

When the component (A) or (B) is a combination of two or more compounds respectively, such a combination may be used either by previously mixing and aging these compounds or by adding them separately.

The proportion of transition metal atom in the component (A) per 1 g.-atom of the total metal atom in the component (B) varies depending upon the component (B-1), (B-2), (B-3) or (B-4) to be used as the component (B).

When the component (B) is (B-1), the proportion of the transition metal atom in the component (A) per 1 g.-atom of total aluminum atom in the component (B-1) is within the range of $10^{-6}$~2 g.-atom, preferably $10^{-5}$~1 g.-atom, most preferably $0.5 \times 10^{-2}$~1 g.-atom.

When the component (B) is (B-2), the proportion of the metal atom in the component (A) per 1 g.-atom of the total metal atom in the aluminum compound and the tin compound to be used as the component (B-2) is within the range of $10^{-3} \sim 2$ g.-atom, preferably $10^{-2} \sim 1$ g.-atom. g.-atom. In this case, the proportion of tin atom in the tin compound of (B-2-b) per 1 g.-atom of aluminum atom in the aluminum compound of (B-2-a) is within the range of $50 \sim 0.02$ g.-atom, preferably $10 \sim 0.1$ g.-atom, most preferably $2 \sim 0.25$ g.-atom.

When the component (B) is (B-3), the proportion of the metal atom in the component (A) per 1 g.-atom of the total metal atom in the component (B-3) is within the range of $10^{-3} \sim 2$ g.-atom, preferably $1^{\circ -2} \sim 1$ g.-atom. In this case, the proportion of the metal atom in the metal halide of (B-3-b) per 1 g.-atom of the metal atom in the organometallic compound of (B-3-a) is within the range of $0.2 \sim 1,000$ g.-atom, preferably $0.5 \sim 200$ g.-atom, most preferably $1 \sim 100$ g.-atom.

When the component (B) is (B-4), the component (A) is limited to vanadyl trichloride. The proportion of vanadium atom in the vanadyl trichloride per 1 g.-atom of aluminum atom in the trialkylaluminum of (B-4) is within the range of $1 \sim 7$ g.-atom, preferably $2 \sim 6$ g.-atom.

A total amount of both the components (A) and (B) to be used can be selected optionally, but a total amount of metal atoms in both components (A) and (B) per 1 mole of the total fed monomer is usually within the range of $10^{-5} \sim 0.5$ g.-atom, preferably $10^{-4} \sim 0.5$ g.-atom, more particularly $10^{-3} \sim 0.2$ g.-atom.

The catalyst system of this invention consists of the above described two components (A) and (B) and they are essential components for carrying out this invention, but it is possible to improve the polymerization activity by adding a radical initiator to this system. The radical initiator is organic peroxides, azonitrile compounds of trialkylboron-oxygen system.

The composition, microstructure, arrangement of monomer units of the resulting copolymers and the like can be confirmed by solubility, nuclear magnetic resonance (NMR) spectrum, infrared (IR) spectrum, elementary analysis, composition analysis of the copolymers obtained by varying monomer feed ratio, stress-strain curve, pyrolysis gas chromatography of the resulting copolymers and the like. Also, when a radical initiator is added to the two components (A) and (B) of this invention, it is possible to obtain the copolymers having substantially the same composition, microstructure and arrangement of monomer units as those in the case of the two component system.

The radical initiator of organic peroxide to be used in this invention as a component (C) includes diacyl peroxides, such as benzoyl peroxide, lauroyl peroxide, caprylyl peroxide, myristoyl peroxide, stearoyl peroxide, 2,4-dichlorobenzoyl peroxide, 4-nitrobenzoyl peroxide, 4-methoxybenzoyl peroxide, 4-chlorobenzoyl peroxide, phthaloyl peroxide, acetyl peroxide, bis-O-carboethoxybenzoyl peroxide, 2-methylpentanoyl peroxide, etc.; ketone peroxides, such as methyl ethyl ketone peroxide, and cyclohexanone peroxide, etc.; hydroperoxides, such as tert-butyl hydroperoxide, paramenthane hydroperoxide, diisopropylbenzene hydroperoxide, and cumene hydroperoxide, etc.; dialkyl peroxides, such as di-tert-butyl peroxide, tert-butylcumylperoxide, and dicumyl peroxide, etc.; peracid esters, such as tert-butyl peroxybenzoate, bis-($\alpha,\alpha$-dimethylbenzyl)dimethyl peroxymalonate, tert-butylperoxyisobutylate, tert-butylperoxyacetate, tert-butyl peroxypivalate, 2,5-dimethylethylhexyl - 2,5 - di(peroxybenzoate), and phenyl peroxycarbamate, etc.; dialkyl percarbonates, such as diisopropyl peroxydicarbonate, di-n-butyl peroxypercarbonate, and tert-butyl peroxyisopropylcarbonate, etc. Among them, diacyl peroxides, such as benzoyl peroxide, peracid esters, such as tert-butyl peroxypivalate and dialkyl percarbonates, such as diisopropyl peroxydicarbonate are particularly preferable.

The azonitrile compounds have the general formula $$RR'C(CN)-N=N-(CN)CR'R$$

wherein R and R' are organic radicals having 1 to 10 carbon atoms and as these azonitrile compounds, mention may be made of the compounds wherein R is methyl group and R' is methyl, ethyl, n-propyl, isopropyl, cyclopropyl, n-butyl, isobutyl, n-amyl, cyclohexyl, 2,2-dimethyl-n-propyl, benzyl, p-chlorobenzyl, p-nitrobenzyl, cyclobutyl, cyclopentyl, cycloheptyl, cyclooctyl or cyclodecyl group, the compounds wherein R is isopropyl group and R' is ethyl or isopropyl group and the compounds wherein R is isobutyl group and R' is isobutyl group. Among them, azobisisobutyronitrile and azobis-2,4-dimethylvaleronitrile are particularly preferable.

Concerning trialkylboron-oxygen system, trialkylboron includes, for example, trimethylboron, triethylboron, tri n - propylboron, triisopropylboron, tri - n - butylboron, tri - isobutylboron, tri - sec - butylboron and the like. The proportion of these boron compounds and oxygen is optional. Among them, tri-n-ethylboron and tri-n-butylboron are particularly preferable.

An amount of the radical initiator to be added for activating the polymerization reaction is sufficient in an amount of about 0.005 to 5 mol percent based on the total amount of the monomers. Of course an amount beyond this range may be used.

The process for feeding the radical initiator is not particularly limited, but of course it should be avoided to feed the initiator under such a condition that the polymerization starts before the total monomers and all other catalytic components are not still charged, for example, at an extremely higher temperature than the decomposition temperature of the radical initiator.

The inventors have succeeded in synthesis of the alternaing copolymers by using each of the above described catalyst systems and further the following facts have been found in the course of investigation for industrial production. Namely, (1) The physical property and processability of the alternating copolymers are influenced considerably by the degree of polymerization, and (2) The degree of polymerization of the alternating copolymers depends mainly upon the amount of catalyst used and the yield of polymerization.

In the above item (2) when the amount of catalyst used decreases, the degree of polymerization increases and when the yield of polymerization increases, the degree of polymerization increases. The amount of catalyst used is naturally preferable to be smaller in view of the economic point and an amount of catalyst remained in the resulting copolymers, but it has been found that if the amount of catalyst to be used decreases, the degree of polymerization increases excessively and the viscosity of the polymerization reaction system extremely increases and the agitation and the removal of reaction heat become difficult and consequently the control of reaction velocity is difficult and therefore a side reaction, for example, gelation may occur. Furthermore, since the degree of polymerization varies according to the yield of polymerization, it is a very difficult in technic to obtain the copolymers having the degree of polymerization of the most preferable range in view of the physical properties and processability in a high reproduceability. Accordingly, a method, by which the degree of polymerization of the copolymers can be controlled, even if the amount of the catalyst used is small, has been demanded.

The inventors have found that when at least one compound selected from the group consisting of mercaptan compounds (I), disulfide compounds (II) and carbon polyhalides (III) containing bromine or iodine as an essential component is added as a molecular weight regulator to the polymerization system in the presence of the above described catalysts for alternating copolymers, the copolymers having a lower molecular weight than the case when the polymerization is effected by using only the catalyst system for the alternating copolymers can be obtained without substantially disturbing the alternating property of the resulting copolymers.

A large number of molecular weight regulators have heretofore been disclosed in radical polymerization, ionic polymeriaztion, coordinate polymerization, and the like but any molecular weight regulator for the alternating copolymerization reaction has never been known. The reaction mechanism itself has never been confirmed and therefore it cannot be conceived that the well-known chain transfer agents are effective directly. For example, carbon polychlorides, such as carbon tetrachloride and chloroform, which have been usually used as a molecular weight regulator for radical polymerization among carbon polyhalides, have no effect. Moreover, for example, cumene and ethylbenzene which have a very large chain transfer constant of radical polymerization of acrylonitrile and the like, have substantially no effect. Accordingly, the molecular weight regulator in the alternating polymerization cannot be discussed with respect to the regulating mechanism similarly to the chain transfer agent in the radical polymerization.

The molecular weight regulator to be used in this invention will be mentioned.

(1) As mercaptan compounds, general compound having mercapto group may be used, for example, methanethiol, ethanethiol, 1-propanethiol, 2-propanethiol, 1-butanethiol, 2-butanethiol, 2-methyl-1-propanethiol, 2-methyl-2-propanethiol, 1-pentanethiol, 2-pentanethiol, 3-pentanethiol, 2-methyl-2-butanethiol, isopentanethiol, 1-hexanethiol, tert-hexylmercaptan, 1-heptanethiol, tert-heptylmercaptan, 1-octanethiol, tert-octanethiol, tert-nonylmercaptan, 1-decanethiol, 1-dodecanethiol, tert-dodecanethiol, 1-tetradecanethiol, tert-tetradecanethiol, n-hexadecanethiol, tert-hexadecanethiol, n-octadecanethiol, ethanedithiol, 1,6-hexanedithiol, dodecanedithiol, 3-ethoxypropanethiol, 2-ethoxypropanethiol, allylmercaptan, thioacetic acid, thiobenzoic acid, thiophenol, ethylthioglycolate, benzylmercaptan, p-ethoxythiophenol, α-toluenethiol, m-toluenethiol, o-toluenethiol, p-toluenethiol, thioxylenol, β-napthalenethiol, p - tert - butylthiophenol, dodecylbenzylmercaptan, toluene-3,4-dithiol, 2-mercaptobenzothiazole, etc., and mixtures thereof.

Furthermore, mercaptan compounds having amino group, hydroxyl group, chloro group or carboxyl group together with mercapto group, such as 4-aminothiophenol, 4-mercaptobenzylchloride, 4-mercaptophenol, 4-mercaptobenzoic acid, p-chloromethylthiophenol, 3-mercaptopropanol, aminoalkylmercaptan, etc., and mixtures thereof may be used.

(2) As disulfide compounds, general compound having disulfide bonding may be used, for example, diacyl disulfide, dialkyl, disulfide, thiuram xanthogen disulfide. The typical examples are dimethyl disulfide, diethyl disulfide, di-n-propyl disulfide, di-isopropyl disulfide, diallyl disulfide, di-n-butyl disulfide, diisobutyl disulfide, di-sec-butyl pentyl disulfide, di-tert-pentyl disulfide, di-tert-hexyl disulfide, di-tert-octyl disulfide, di-tert-dodecyl disulfide, di-octadecyl disulfide, di-tert-tetradecyl disulfide, di-acetyl disulfide, diphenyl disulfide, o-tolyl disulfide, p-tolyl disulfide, 2,3,4,6-tetramethylphenyl disulfide, p-ethoxyphenyl disulfide, p-anisil disulfide, p-carboxyphenyl disulfide, benzyl disulfide, benzoyl disulfide, p-chlorobenzyl disulfide, 2-naphthyl disulfide, benzothiazyl disulfide, tetramethylthiuram disulfide, tetraethylthiuram disulfide, diisopropylxanthogen disulfide, dibenzothiazyl disulfide.

(3) As carbon polyhalides containing bromine or iodine as an essential component, carbon tetrabromide, trichloromonobromomethane, bromoform, iodoform, carbon tetraiodide and the like and mixtures thereof may be used.

The process for adding these molecular weight regulators is not particularly defined. An amount of these molecular weight regulators used varies within a broad range depending upon the monomers to be copolymerized, catalyst system to be used, polymerization temperature and other conditions and the molecular weight regulators to be used. In general, the amount of the regulator is $5 \times 10^{-2}$ to $10^{-8}$ mole per mole of the total monomers, preferably $10^{-2}$ to $10^{-6}$ mole. The amount beyond this range may be naturally used according to the object. Generally, the larger the amount of the regulator, the lower the molecular weight of the resulting copolymer is. A liquid polymer can be obtained depending upon the amount of the regulator used.

The composition, microstructure, arrangement of monomer units of the resulting copolymers and the like can be confirmed by solubility, NMR spectrum, IR spectrum, elementary analysis composition analysis of the copolymer obtained by varying monomer feed ratio, stress-strain curve, pyrolysis gas chromatography of the copolymers and the like and when the molecular weight regulator is used together with the catalyst system for the alternating copolymerization, it is possible to obtain the copolymer having substantially the same composition, microstructure and arrangement of monomer units as those of the copolymer obtained by the copolymerization reaction by means of the catalyst system for the alternating copolymerization alone and having a molecular weight smaller than the copolymer.

The copolymerization reaction can substantially be carried out by a bulk polymerization without the use of a solvent, and further carried out in a solvent which does not prevent the copolymerization reaction.

As such solvents, mention may be made of aromatic hydrocarbons, aliphatic hydrocarbons, alicyclic hydrocarbons, halogenated hydrocarbons, and carbon disulfide, for example, pentane, butane, propane, hexane, heptane, octane, ligroin, petroleum ether and other petroleum mixed solvent, liquid paraffin, chlorinated paraffin, cyclohexane, benzene, toluene, xylene, dichloromethane, 1,2-dichloroethane, 1,1-dichloroethane, trichloroethane, tetrachloroethane, trichloroethylene, dibromomethane, 1,2-dibromomethane, bromobenzene, 1,1,2,2-tetrabromoethane, tetrachloroethylene, butyl chloride chloroform, chlorobenzene, dichlorobenzene and carbon disulfide and their mixtures.

A ratio of the solvent to be used based on the monomer can be selected optionally.

The polymerization temperature is within the range of $-78°$ C.$\sim +100°$ C., preferably $-30°$ C.$\sim +80°$ C.

The copolymerization reaction is carried out under a pressure from one determined by vapor pressure in the reaction system to 50 atm.

The copolymerization reaction is preferably carried out under an inert atmosphere, for example, nitrogen gas.

After the completion of the polymerization reaction, the after-treatment is carried out by conventional methods to purify and recover the copolymer. These methods include alcohol precipitation, alcohol washing, alcohol-hydrochloric acid washing, hydrochloric acid-water washing and the like. Furthermore, an after-treatment for the polymer obtained by a catalyst containing Lewis acid may be used. In addition, a process for separating and recovering the catalytic components by adding a compound capable of forming a complex with the catalytic component may be used.

The copolymers obtained by the method according to the present invention have various properties according to the combination of monomers, the kind, composition and amount of the catalyst, the monomer feed ratio and the other polymerization condition. However, the structure of the alternating copolymers does not vary.

The composition, microstructure and arrangement of both monomer units in the obtained copolymers are confirmed by solubility, NMR spectrum, IR spectrum, elementary analysis, composition analysis of the copolymers obtained by varying the monomer feed ratio, stress-strain curve of the resulting copolymers, pyrolysis gas chromatography and the like. With respect to these points, an explanation will be made by exemplifying butadiene/acrylonitrile copolymer.

For a better understanding of the invention, reference is taken to the accompanying drawings, wherein.

Figure 1:
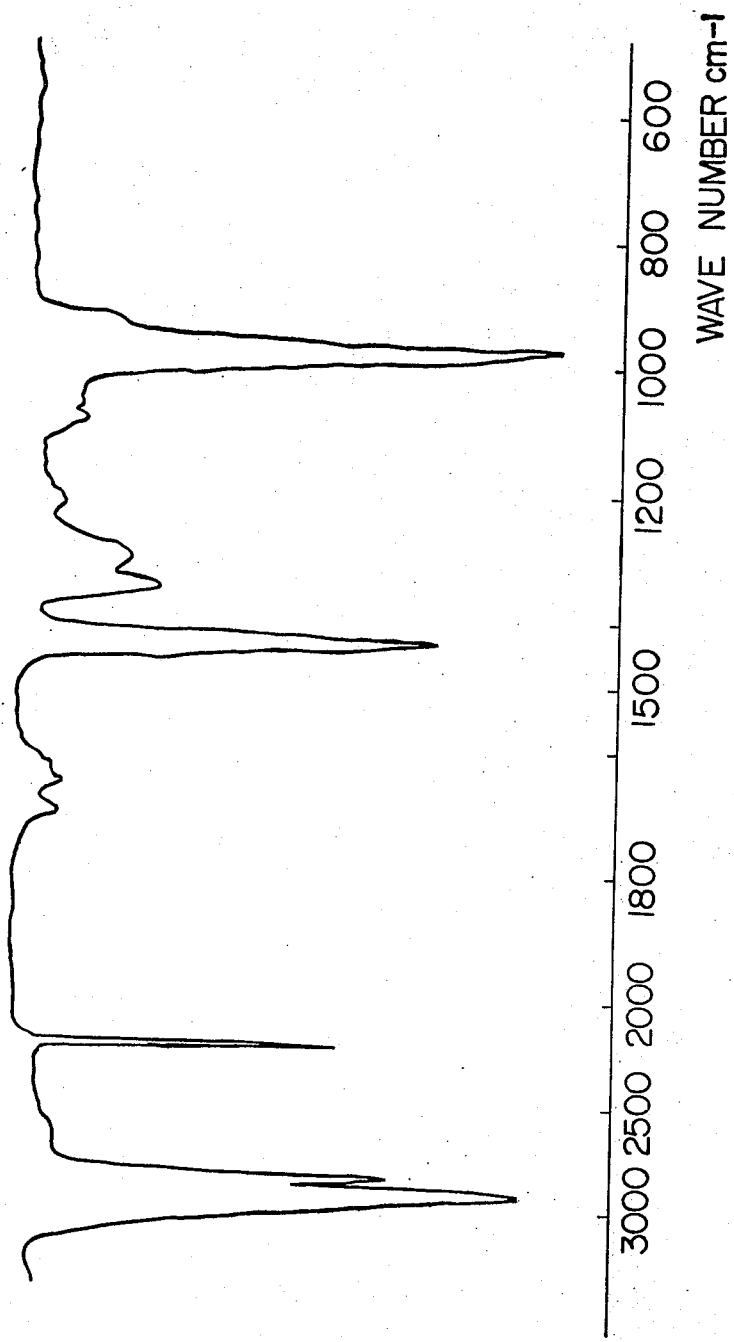
FIG. 1 is an infrared absorption spectrum diagram of butadiene/acrylonitrile copolymer in the following Example 39.
Figure 2:
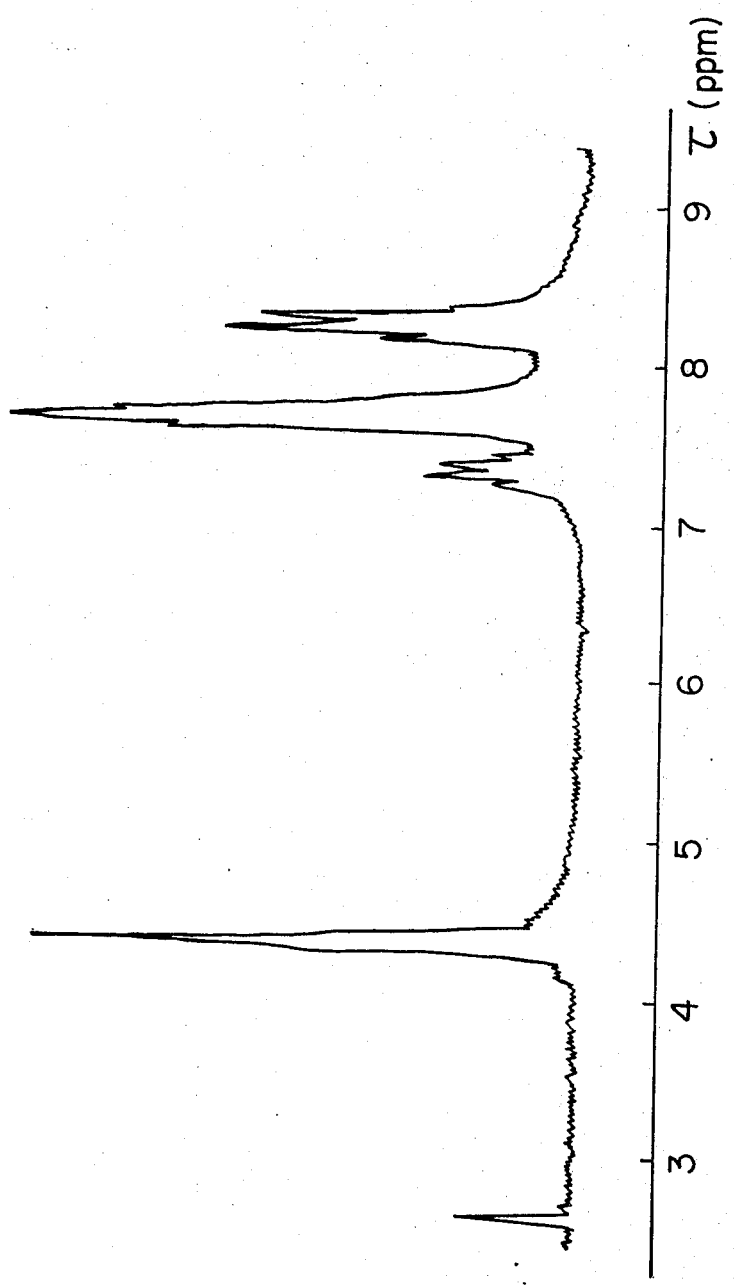
FIG. 2 is a nuclear magnetic resonance spectrum diagram of the same copolymer as in FIG. 1.
Figure 3:
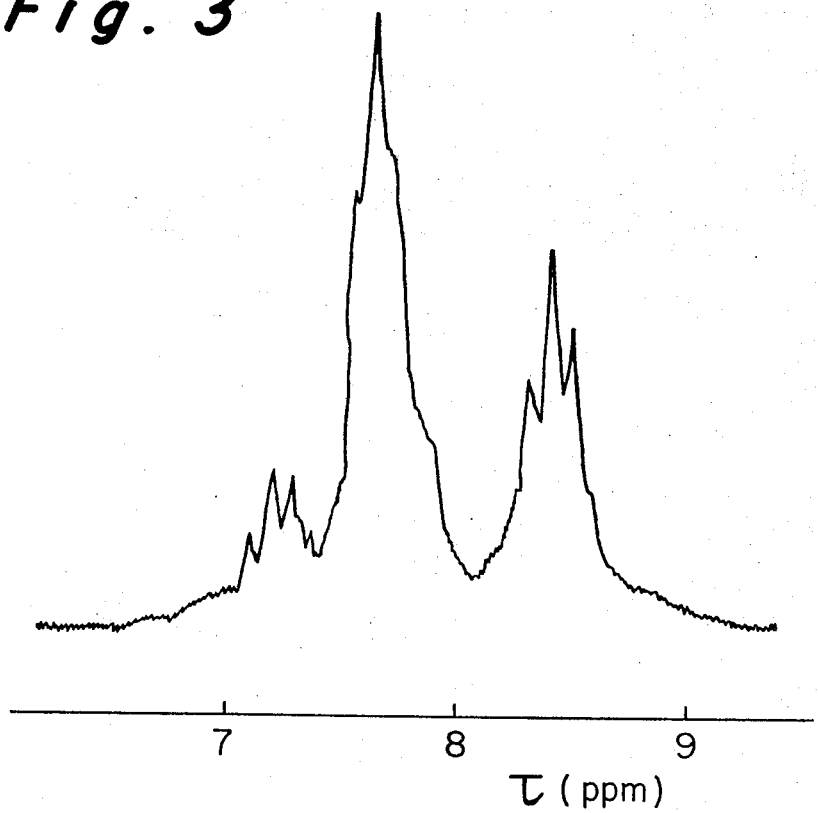
FIG. 3 is a nuclear magnetic resonance spectrum diagram of butadiene/acrylonitrile copolymer in the following Example 1.

(a) Solubility.—The acrylonitrile/butadiene copolymer obtained by the present invention is soluble in dimethylformamide, tetrahydrofuran, acetonitrile, benzonitrile, acrylonitrile, methyl ethyl ketone, chloroform, nitromethane, dioxane, acetone, dimethyl sulfoxide, aniline, nitropropane, nitrobenzene, ethyl acetate, trichloroethane and the like but insoluble in hexane, heptane, benzene and toluene.

This shows that said copolymer is considerably different from polyacrylonitrile insoluble in acetonitrile, tetrahydrofuran, chloroform, dioxane and acetone and polybutadiene insoluble in dioxane, acetone, acetonitrile and soluble in toluene. Furthermore, it can be seen that the copolymer does not contain homopolymer and has a structure, which is considerably different from that of each homopolymer.

(b) IR spectrum.—The butadiene/acrylonitrile copolymer obtained by the present invention was dissolved in tetrahydrofuran, and the resulting solution was formed into a copolymer film on a rock salt plate and then IR spectrum of the copolymer film was measured. The characteristic absorption band of nitrile group in acrylonitrile unit and the characteristic absorption band of trans-1,4 bond in butadiene unit were distinctly observed at 2,240 cm.$^{-1}$ and 970 cm.$^{-1}$ respectively, but the characteristic absorption bands of (—C=N—) in acrylonitrile unit and cis-1,4 bond in butadiene unit were not observed, and 1,2-bond in butadiene unit was very small. Besides, when the microstructure of butadiene unit in the copolymer was analyzed by means of a method described in Chim. e. Ind., 41, 758 (1959) by Morero et al., trans-1,4 bond was 97%, 1,2-bond 3% and cis-1,4 bond ~0%. The copolymers produced by the different polymerization conditions gave always the same IR spectrum.

The method of the present invention always provided butadiene/acrylonitrile copolymer connected butadiene in trans-1,4 type of more than 95%.

The composition ratio of both the monomer units in the copolymer can also be analyzed from IR spectrum. For example, when as the characteristic absorption bands of acrylonitrile unit and butadiene unit are selected 2,240 cm.$^{-1}$ and 970 cm.$^{-1}$ respectively and the ratio of absorbance of these absorption bands is measured, if the composition of the copolymer is constant, the ratio of the absorbance is constant, so that said ratio indicates the composition of the copolymer. By this method, it was found that the copolymers obtained by the present invention have always the same composition. Moreover, it was confirmed from elementary analysis and NMR spectrum that the composition mole ratio of both the monomer units is substantially 1:1.

(c) NMR spectrum.—Various acrylonitrile/butadiene copolymers obtained by the present method were dissolved in deuterochloroform and measured at 60 Mc./sec. or 100 Mc./sec. with respect to NMR spectrum to always obtain the same spectrum. In each NMR spectrum, the chemical shift of each proton assigned to butadiene unit and acrylonitrile unit was observed. Furthermore, it was found that said chemical shift is entirely different from the chemical shifts of polybutadiene, polyacrylonitrile and block bond of butadiene unit. In the chemical shift of the butadiene/acrylonitrile copolymer obtained by the present invention, the chemical shift assigned to butadiene unit was observed in $\tau=4.43$ and 7.70 and the chemical shift assigned to acrylonitrile unit was observed in $\tau=$about 7.35 and 8.27 and the other chemical shifts were not observed. The copolymer produced by emulsion polymerization using a conventional free radical initiator was measured with respect to NMR spectrum. The NMR spectra of the copolymer of the invention and the copolymer produced by the emulsion polymerization were compared. In the NMR spectrum of the copolymer obtained by the emulsion polymerization, the chemical shifts owing to block bond were observed in addition to the chemical shifts observed in the copolymer of the invention. For example, the methine proton in butadiene unit was observed as a shoulder at $\tau=$about 4.6 and the methylene proton in butadiene unit was observed as an additional peak at $\tau=7.87$. These additional peaks were increased in random copolymer containing 60 mol percent of butadiene unit, and the peak in $\tau=7.87$ was larger than the peak in $\tau=7.70$. From this it was found that the chemical shifts in $\tau=$about 4.6 and 7.87 are due to the block bond of butadiene unit. This fact shows that in the butadiene/acrylonitrile copolymer obtained by the present invention, both the monomer units are bonded substantially alternately.

The composition ratio of both the monomer units in the copolymer can be calculated from an area ratio of resonance spectrum of each proton in NMR spectrum.

It was confirmed with the copolymer having a well-known composition ratio that this means is correct. For example, the composition ratio of the copolymer can be calculated from the ratio of the integral value of the spectrum of methine proton in butadiene unit to the integral value of the spectra of methine proton and methylene proton in acrylonitrile unit and methylene proton in butadiene unit. When the composition of the copolymer obtained by the present invention was analyzed by this means, it was found that even if the composition of fed monomers is varied, the composition of the resulting copolymers does not vary always and the mole ratio of both the monomer units is 1:1.

(d) Elementary analysis.—As a method of copolymerizing butadiene with acrylonitrile, the use of a free radical initiator has been known. In this copolymerization reaction, the composition of the copolymer is determined by a probability limited by monomer feed ratio, the monomer reactivity ratios and the like.

Therefore, in the same combination of monomers, the composition of the copolymer generally is varied by changing the monomer feed ratio. Accordingly, the distinction of an alterating copolymer of the present invention and a random copolymer obtained by using a free radical initiator can be attained by observing the variation of the composition of the copolymer corresponding to the variation of the fed monomers or comparing the found value and the theoretical value of the composition of the copolymer in free radical copolymerization reaction.

The composition of the copolymer can be measured by an elementary analysis of the copolymer. By this method, it has been found that the composition of the copolymer obtained by the present invention has no relation to the theoretical value of the free radical copolymer and has substantially always a constant composition. Furthermore, it has been supported that the composition is substantially always 1:1 and the resulting copolymer has an alternating copolymerization configuration.

(e) Pyrolysis.—A method of quantifying monomers generated by pyrolysis with gas chromatography.

The butadiene/acrylonitrile copolymer obtained by the present invention was subjected to a pyrolysis at 500° C. and the proportion of the generated butadiene monomer and acrylonitrile monomer was measured and compared with the value in a random copolymer. As the result, the former, i.e., the copolymer obtained by the present invention, contains about 28% of acrylonitrile monomer, while the latter, i.e. the free radical copolymer was about 60%. Thus, the generated acrylonitrile monomer in the copolymers of the present invention is very small as compared with that in the free radical copolymer. This fact supports that the copolymer of the present invention has an alternating configuration.

(f) Stress-strain curve.—When the strain is small, the proportion of the stress variation is small, but when the strain is large, the proportion of the stress variation is large corresponding to the variation of the strain, so that a state of the rising of the curve is observed. From this, it can be seen that a rapid increase of strength is based on the orientation-crystallization by drawing. Such an orientation-crystallization has never been found in the known random copolymers. This phenomenon is a remarkable characteristic of the novel alternating copolymer provided by the inventors. In addition, this phenomenon proves that the copolymer has an excellently regular and alternating configuration.

As mentioned above, the butadiene/acrylonitrile copolymers obtained by the present invention are the alternating copolymers different from random and graft copolymers obtained by a conventional emulsion polymerization process using a known free radical initiator and have remarkable characteristics which have never been observed in these conventional random and graft copolymers. For example, the properties in the butadiene/acrylonitrile copolymer will be explained in detail hereinafter.

(1) The alternating copolymer has a lower glass transition temperature in uncured state than the conventional random copolymer having the same butadiene unit content.

(2) Compounds were prepared according to the following recipe and then cured at 145° C. for 30 minutes.

| | Parts |
|---|---|
| Copolymer | 100 |
| Carbon black SRF | 45 |
| Zinc white | 5 |
| Stearic acid | 1 |
| Phenyl-β-naphthylamine | 1 |
| Accelerator NOBS sp. | 1 |
| Sulfur | 1.5 |

Next, physical properties of the conventional random copolymer and the alternating copolymer obtained by the present invention were measured in the cured state. The results are shown in the following table.

| | Alternating copolymer [1] | Random copolymer |
|---|---|---|
| (a) Original state: | | |
| Hardness (JIS) | 73 | 86 |
| 100% modulus (kg./cm.$^2$) | 44 | 105 |
| Tensile strength (kg./cm.$^2$) | 240 | 194 |
| Elongation (percent) | 408 | 210 |
| (b) Oil resistance [2]: | | |
| Swell (percent) | 110 | 112 |
| Tensile strenght (kg./cm.$^2$) | 145 | 97 |
| Elongation (percent) | 308 | 150 |

[1] Intrinsic viscosity in dimethylformamide at 30° C. is 1.75.
[2] Oil=JIS "B", room temperature×48 hours. "B"=Isooctane/toluene (70/30).

As seen from this result, it can be seen that the alternating copolymer has remarkable characteristics which have never been possessed by the random copolymer. Namely, hardness and modulus are small and tensile strength and elongation are considerably large. Furthermore, tensile strength and elongation after swollen are extremely large, and the impact resilience of the alternating copolymer at 60° C. was 160% of the impact resilience of the random copolymer.

As described above it is apparent that the alternating copolymers of the present invention possess the characteristics which cannot be considered from the random copolymer and have desirable excellent properties to be used as rubber.

There are many applications in which these characteristics can be utilized and many of them are developed by the properties of the alternating copolymer which have not been possessed by the conventional random and graft copolymers.

The alternating copolymers may be used as such and further may be converted to a material having a three-dimensional configuration by means of a cross linking agent.

They have wide utilization, for example, they can be used for various plastic materials, materials for rubbery composition, adhesive, fiber, film, compound, latex, paint, surface treating agent, etc.

The following examples are given in illustration of this invention and are not intended as limitations thereof.

EXAMPLE 1

A beverage bottle of 100 ml. capacity was thoroughly dried, and air in the bottle was replaced with gaseous nitrogen. Into the bottle was charged 0.2 mmole of azobisisobutyronitrile. The bottle was cooled to −78° C. and further charged with 2.0 mmoles of ethylaluminum dichloride. Immediately, 100 mmoles of butadiene and 100 mmoles of acrylonitrile purified by distillation were charged into the bottle and after stirred thoroughly, 0.1 mmole of vanadyl trichloride was added thereto, after which the bottle was closed tightly.

The bottle was thoroughly shaken and left to stand in a thermostat maintained at 60° C. for 3 hours to effect polymerization, and then a small amount of methanol was added to stop the polymerization. The resulting polymer was washed with methanol containing 2,6-di-tert-butyl-p-cresol as an antioxidant and dried under vacuum.

The obtained polymer was a rubbery elastomer and the yield expressed by the weight of the polymer based on total weight of the monomers was 50.33%. The resulting polymer was substantially dissolved in chloroform, methyl ethyl ketone and dimethylformamide, but contained only a small amount of insoluble part (gel).

The intrinsic viscosity of the polymer in dimethylformamide at 30° C. was 1.75.

The polymer was dissolved in deuterochloroform, and NMR spectrum of the polymer was measured at 60 megacycles.

As a control, NMR spectrum was measured with respect to a conventional random copolymer having a known acrylonitrile content under the same conditions. As the result, it was confirmed that the composition of the copolymer can be determined from the ratio of hte area of NMR spectrum of the methine proton in butadiene unit to the area of NMR spectrum of the methine proton of acrylonitrile unit and the methylene proton of acrylonitrile unit and butadiene unit. In this way, the composition of the resulting copolymer was identified.

As the result, it was found that the content of acrylonitrile unit was 50.4 mol percent. That is, the resulting copolymer was composed of the same mole amount of butadiene unit and acrylonitrile unit and the composition was 1:1.

Furthermore, it was found that the copolymer contained neither homopolymer nor block polymer by checking chemical shifts and had a good stereospecific property from the simplicity and the sharpness of NMR spectrum.

The above-mentioned facts obtained by the NMR spectrum show that the copolymer is an alternating copolymer having a good stereospecific property.

Moreover, the copolymer was dissolved in chloroform and formed into a film on a rock salt plate and the IR spectrum of the copolymer was measured.

As the result, the charactertistic absorption band of nitrile group in the acrylonitrile unit and that of trans-1,4 bond in the butadiene unit were observed apparently at 2,240 cm.$^{-1}$ and 973 cm.$^{-1}$ respectively. The characteristic absorption band of 1,2-bond in the butadiene unit was negligible and that of cis-1,4 bond was not substantially observed.

The microstructure value measured by Morero's method was 97% of trans-1,4 bond, 3.0% of 1,2-bond and 0% of cis-1,4 bond.

As described above the obtained copolymer was a stereospecific alternating copolymer, wherein substantially the whole butadiene units were bonded in trans-1,4 type. According to the elementary analysis, found value of carbon was 78.46%, that of hydrogen 8.36%, and that of nitrogen 13.18%. In the theoretical values of alternating copolymer containing the same moles of butadiene and acrylonitrile, carbon is 78.46%, hydrogen 8.47%, and nitrogen 13.07%, so that the found values agree with the theoretical values well.

COMPARATIVE EXAMPLE 1

A copolymerization reaction was effected under the same conditions as described in Example 1 except using no azobisisobutyronitrile. The reaction product was treated in the same manner as described in Example 1 to obtain a copolymer. The yield was only 12.23%.

It was confirmed from an elementary analysis (carbon: 78.08%; hydrogen: 8.56%; nitrogen: 13.36%), IR spectrum, NMR spectrum and the like that the obtained copolymer was an alternating copolymer. However, it can be seen that the polymerization activity of the catalyst is lower than that of Example 1.

EXAMPLE 2

A beverage bottle of 100 ml. capacity was thoroughly substituted with gaseous nitrogen. Into the bottle were charged 100 mmoles of acrylonitrile purified by distillation, 100 mmoles of butadiene cooled at —78° C., 2.0 mmoles of ethylaluminum dichloride, 0.4 mmole of vanadyl trichloride and 1.0 mmole of azobisisobutyronitrile in this order, after which the bottle was closed tightly and a polymerization reaction was effected at 60° C. for 2 hours. The stopping of the reaction and the treatment of the reaction product were effected in the same manner as described in Example 1. The product was a rubbery elastomer and the yield was 76.0% based on the total amount of the monomers.

It was found from the NMR spectrum as described in Example 1 that the product is an alternating copolymer having a composition of butadiene/acrylonitrile=1/1. The IR spectrum showed that the whole butadiene units were substantially bonded in trans-1,4 type. According to the elementary analysis of the product, found value of carbon was 78.17%, that of hydrogen 8.94% and that of nitrogen 12.88% and these values agreed with the theoretical values (carbon: 78.46%; hydrogen: 8.47%; nitrogen: 13.07%) of an alternating copolymer containing the same moles of butadiene and acrylonitrile.

COMPARATIVE EXAMPLE 2

A copolymerization reaction was effected in the same manner as described in Example 2 except using no azobisisobutyronitrile. The obtained copolymer was a rubbery elastomer having a low molecular weight and an adhesive property and the yield of 16.6%.

EXAMPLE 3

A copolymerization reaction was effected in the same manner as described in Example 1 except that tert-butyl peroxide was used instead of azobisisobutyronitrile, and acrylonitrile, butadiene, ethylaluminum dichloride, vanadyl trichloride and tert-butyl peroxide were charged in this order and the polymerization contdition was 20° C. and 3 hours. The yield of the obtained copolymer was 21.5% and it was confirmed from NMR spectrum, IR spectrum and elementary analysis that the copolymer was an alternating copolymer.

EXAMPLE 4

A copolymerization reaction was effected in the same manner as described in Example 1 except that 300 mmoles of acrylonitrile was used.

The obtained copolymer was a rubbery elastomer, and the yield was 59.0%. The copolymer was completely dissolved in methyl ethyl ketone. The NMR spectrum and the IR spectrum of the copolymer were substantially the same as those obtained in Example 1, and it was confirmed that the copolymer was an alternating copolymer. According to elementary analysis, found value of carbon was 76.96%, that of hydrogen 8.27% and that of nitrogen 14.77%, and these values substantially agreed with the theoretical values of the alternating copolymer.

EXAMPLE 5

A beverage bottle of 100 ml. capacity was thoroughly substituted with gaseous nitrogen in the interior and cooled to —78° C. The bottle was charged with 300 mmoles of acrylonitrile, 100 mmoles of butadiene, 4 mmoles of ethylaluminum dichloride, 0.4 mmole of vanadyl trichloride, 1 mmole of triethylboron and air corresponding to 0.5 mmole of oxygen and closed tightly, after which a copolymerization reaction was effected at 0° C. for 3 hours. The resulting copolymer was a rubbery elastomer and the yield was 49.0%. Elementary analysis showed that the acrylonitrile content was 50.4%. It was found from NMR spectrum that the copolymer was an alternating copolymer having a composition of butadiene and acrylonitrile of 1:1.

COMPARATIVE EXAMPLE 3

A copolymerization reaction was effected in the same manner as described in Example 5 except adding no triethylboron and oxygen. The yield of the resulting copolymer was 35.0%.

EXAMPLE 6

In the same manner as described in Example 1, 533 mmoles of acrylonitrile, 100 mmoles of butadiene, 0.5 mmole of ethylaluminum dichloride, 0.05 mmole of vanadyl trichloride and 0.1 mmole of azobis - 2,4 - dimethylvaleronitrile were charged in the beverage bottle and a copolymerization reaction was effected at 60° C. for 3 hours. The resulting copolymer was a rubbery elastomer and the yield was 38.4%. When a copolymerization reaction was effected under the same condition as described above except using no azobis - 2,4 - dimethylvaleronitrile, the yield was only 14.4%.

EXAMPLE 7

A copolymerization reaction was effected at 60° C. for 3 hours in the same manner as described in Example 1 except that 300 mmoles of acrylonitrile, 100 mmoles of butadiene, 1.0 mmole of ethylaluminum dichloride, 0.1 mmole of vanadyl trichloride and given amounts of diisopropyl peroxydicarbonate and dimethylaniline. The obtained results are shown in the following Table 1.

TABLE 1

| Experimental number | IPP[1] (mmol) | DMA[2] (mmol) | Yield (percent) |
|---|---|---|---|
| 7-1 | | | 20.4 |
| 7-2 | 0.5 | | 25.2 |
| 7-3 | 0.5 | 0.1 | 39.0 |

[1] Diisopropyl peroxydicarbonate.
[2] Dimethylaniline.

EXAMPLE 8

In order to judge whether or not the copolymers obtained by using the catalyst of the present invention have substantially alternating structure, copolymerization reactions were effected by varying the composition ratio of each monomer.

The total amount of the monomers was 400 mmoles and the polymerization was started at 60° C. The copolymerization reaction was stopped at 60° C. in Experimental Nos. 8-1 to 8-20 and at 80° C. in Experimental Nos. 8-21 to 8-26, respectively at the beginning stage of the copolymerization, and the polymerization product was analyzed to obtain a result shown in the following Table 2.

It can be seen from Table 2 that in the catalyst system composed of ethylaluminum dichloride and vanadyl trichloride combined with a radical initiator as mentioned in the present invention, the ratio of acrylonitrile unit to butadiene unit in copolymer is substantially 1:1 over a broad range of monomer feed ratio. On the other hand, in a typical free radical catalyst, i.e. single catalyst system of azobisisobutyronitrile, the acrylonitrile content in the copolymer changes according to a monomer feed ratio and consequently a random copolymer is obtained.

EXAMPLE 11

According to the same manner as described in Example 9, 300 mmoles of acrylonitrile, 100 mmoles of isoprene, 4.0 mmoles of ethylaluminum dichloride, 0.4 mmole of vanadyl trichloride and 2.0 mmoles of benzoyl peroxide were charged into a beverage bottle, and then the bottle was closed tightly and a copolymerization reaction was effected at 40° C. for 27 hours.

The yield of the resulting copolymer was 35.3% based on the molar ratio of acrylonitrile to isoprene=1:1. It was found from elementary analysis that the molar ratio of acrylonitrile to isoprene was 47.5:52.5 and consequently said ratio was substantially 1:1.

EXAMPLE 12

Into a beverage bottle were charged 100 mmoles of butadiene and various amounts of acrylonitrile and n-butyl

TABLE 2

| Experimental number | Acrylonitrile/ butadiene (molar ratio) | Catalyst system (mmol) | Yield (percent) | Acrylonitrile content (percent) |
|---|---|---|---|---|
| 8-1 | 2/8 | AlEtCl$_2$ (0.91)-VOCl$_3$ (0.09) | 2.1 | 45.8 |
| 8-2 | 3/7 | AlEtCl$_2$ (0.91)-VOCl$_3$ (0.09) | 2.3 | 45.0 |
| 8-3 | 5/5 | AlEtCl$_2$ (0.91)-VOCl$_3$ (0.09) | 3.7 | 45.3 |
| 8-4 | 7/3 | AlEtCl$_2$ (0.91)-VOCl$_3$ (0.09) | 5.4 | 48.6 |
| 8-5 | 8/2 | AlEtCl$_2$ (0.91)-VOCl$_3$ (0.09) | 6.1 | 51.5 |
| 8-6 | 2/8 | AlEtCl$_2$ (0.77)-VOCl$_3$ (0.077)-AIBV[1] (0.154) | 1.3 | 45.4 |
| 8-7 | 3/7 | AlEtCl$_2$ (0.77)-VOCl$_3$ (0.077)-AIBV[1] (0.154) | 1.6 | 45.1 |
| 8-8 | 5/5 | AlEtCl$_2$ (0.77)-VOCl$_3$ (0.077)-AIBV[1] (0.154) | 2.8 | 45.1 |
| 8-9 | 7/3 | AlEtCl$_2$ (0.77)-VOCl$_3$ (0.077)-AIBV[1] (0.154) | 3.3 | 48.2 |
| 8-10 | 8/2 | AlEtCl$_2$ (0.77)-VOCl$_3$ (0.077)-VIBA[1] (0.154) | 2.9 | 51.3 |
| 8-11 | 2/8 | AlEtCl$_2$ (0.77)-VOCl$_3$ (0.077)-(V-65)[2] (0.154) | 1.1 | 43.9 |
| 8-12 | 3/7 | AlEtCl$_2$ (0.77)-VOCl$_3$ (0.077)-(V-65)[2] (0.154) | 1.1 | 43.2 |
| 8-13 | 5/5 | AlEtCl$_2$ (0.77)-VOCl$_3$ (0.077)-(V-65)[2] (0.154) | 3.0 | 42.8 |
| 8-14 | 7/3 | AlEtCl$_2$ (0.77)-VOCl$_3$ (0.077)-(V-65)[2] (0.154) | 4.4 | 48.9 |
| 8-15 | 8/2 | AlEtCl$_2$ (0.77)-VOCl$_3$ (0.077)-(V-65)[2] (0.154) | 4.7 | 53.1 |
| 8-16 | 2/8 | AlEtCl$_2$ (1.0)-VOCl$_3$ (0.1)-IPP[3] (0.2)-DMA[4] (0.04) | 0.9 | 47.5 |
| 8-17 | 3/7 | AlEtCl$_2$ (1.0)-VOCl$_3$ (0.1)-IPP[3] (0.2)-DMA[4] (0.04) | 1.3 | 46.5 |
| 8-18 | 5/5 | AlEtCl$_2$ (1.0)-VOCl$_3$ (0.1)-IPP[3] (0.2)-DMA[4] (0.04) | 1.5 | 47.6 |
| 8-19 | 7/3 | AlEtCl$_2$ (1.0)-VOCl$_3$ (0.1)-IPP[3] (0.2)-DMA[4] (0.04) | 1.4 | 49.0 |
| 8-20 | 8/2 | AlEtCl$_2$ (1.0)-VOCl$_3$ (0.1)-IPP[3] (0.2)-DMA[4] (0.04) | 1.4 | 50.6 |
| 8-21 | 3.26/6.74 | AIBN[1] (1.0) | 2.5 | 37.3 |
| 8-22 | 5.18/4.82 | AIBN[1] (1.0) | 0.9 | 44.1 |
| 8-23 | 6.15/3.85 | AIBN[1] (1.0) | 2.5 | 46.5 |
| 8-24 | 7.11/2.89 | AIBN[1] (1.0) | 1.4 | 50.0 |
| 8-25 | 8.07/1.93 | AIBN[1] (1.0) | 8.7 | 56.0 |
| 8-26 | 9.04/0.96 | AIBN[1] (1.0) | 2.2 | 62.9 |

[1] Azobisisobutyronitrile.
[2] Azobis-2,4-dimethylvaleronitrile.
[3] Diisopropyl peroxydicarbonate.
[4] Dimethylaniline.

EXAMPLE 9

Into a beverage bottle of 100 ml. capacity were charged 100 mmoles of butadiene, and 100 mmoles of n-butyl acrylate at −78° C. under nitrogen atmosphere, and further charged 4.0 mmoles of ethylaluminum dichloride, 0.08 mmole of vanadyl trichloride and 0.4 mmole of azobisisobutyronitrile. After the bottle was closed tightly, a copolymerization reaction was effected at 60° C. for 24 hours. The yield of the obtained copolymer was 30.8%. It was found from elementary analysis that the copolymer was an alternating copolymer containing 49.5 mol percent of n-butyl acrylate and 50.5 mol percent of butadiene.

EXAMPLE 10

A copolymerization reaction was effected in the same manner as described in Example 9 except that methyl methacrylate was used instead of n-butyl acrylate.

The yield of the resulting copolymer was 13.5%. It was found from elementary analysis that the copolymer was an alternating copolymer containing 47.5 mol percent of methyl methacrylate and 52.5 mol percent of butadiene.

acrylate as shown in the following Table 3 at −78° C., and further charged 4.0 mmoles of ethylaluminum dichloride, 0.4 mmole of vanadyl trichloride and 0.4 mmole of azobisisobutyronitrile. After the bottle was closed tightly, a copolymerization reaction was effected at 60° C. for 0.15 hour.

The obtained results are shown in Table 3.

TABLE 3

| Experimental number | Monomer (mmol) | | | Yield (percent) | Polymer (mol percent) | | | T$_g$ (° C.) |
|---|---|---|---|---|---|---|---|---|
| | Butadiene | Acrylonitrile | n-Butyl acrylate | | Butadiene | Acrylonitrile | n-Butyl acrylate | |
| 12-1 | 100 | 67 | 33 | 10.1 | 45.8 | 37.9 | 16.3 | −35 |
| 12-2 | 100 | 70 | 30 | 6.5 | 47.3 | 41.7 | 11.0 | −34 |
| 12-3 | 100 | 80 | 20 | 13.6 | 48.8 | 40.9 | 10.3 | −25 |
| 12-4 | 100 | 90 | 10 | 21.1 | 47.0 | 47.0 | 5 | −22 |
| 12-5 | 100 | 96 | 4 | 20.6 | 48.7 | 48.3 | 3 | −11 |

It can be seen from Table 3 that the resulting copolymer is a terpolymer in which the ratio of conjugated diene (butadiene) to conjugated polar vinyl monomer (sum of acrylonitrile and n-butyl acrylate) is substantially 1:1. Furthermore, it can be seen that the presence of a small amount of n-butyl acrylate in the copolymer lowers the glass transition temperature (T$_g$) of the copolymer. This is considerably advantageous for improving low-temperature property of the copolymer.

EXAMPLE 13

Into a beverage bottle were charged 533 mmoles of acrylonitrile and 100 mmoles of butadiene at −78° C. and further charged 0.5 mmole of ethylaluminum dichloride, 0.05 mmole of vanadyl trichloride and a given amount of radical initiator, after which the bottle was closed tightly and a copolymerization reaction was effected at 80° C. for 3 hours. The obtained results are shown in the following Table 4.

TABLE 4

| Experimental number | Radical initiator | Mmol | Yield (percent) |
|---|---|---|---|
| 13-1 | | | 26.6 |
| 13-2 | Azobis-2,4-dimethylvaleronitrile | 0.1 | 55.2 |
| 13-3 | Azobisisobutyronitrile | 0.1 | 72.1 |

The resulting polymers were rubbery elastomers containing no gel, respectively.

EXAMPLE 14

A microstructure of chain of monomer units in the butadiene-acrylonitrile copolymer obtained by polymerizing at 80° C. in the presence of the catalyst system according to the present invention and that in a copolymer having the same composition as the copolymer described above, which is obtained by polymerization with a free radical initiator, were measured with NMR at 100 megacycles.

Namely, acrylonitrile and butadiene were copolymerized in a molar ratio of 6.5/3.5 at 80° C. for 1 hour in the presence of ethylaluminum dichloride-vanadyl trichloride-azobisisobutyronitrile system or azobisisobutyronitrile single system, and the obtained samples were analyzed by means of NMR, whereby the proportions of acrylonitrilebutadiene bond ($F_{AB}$), acrylonitrile-acrylonitrile bond ($F_{AA}$) and butadiene-butadiene bond ($F_{BB}$) in the polymer were estimated. The obtained results are shown in the following Table 5.

tle were charged 13 ml. of dehydrated toluene and 300 mmoles of dehydrated and purified acrylonitrile (AN), and cooled to −78° C. Then the bottle was charged with 100 mmoles of butadiene (BD), 0.5 mmole of ethylaluminum dichloride ($EtAlCl_2$), 0.05 mmole of vanadyl trichloride ($VOCl_3$), 0.1 mmole of azobisisobutyronitrile (AIBN) and then a given amount of n-dodecylmercaptan (n-$C_{12}H_{25}SH$) as a molecular weight regulator as shown in the following Table 6, and the bottle was closed tightly. Thereafter, the bottle was shaken in a thermostat maintained at 80° C. for a given time to effect polymerization. Then, the bottle was cooled and opened, and the resulting product was poured into methanol containing 2,6-di-tert-butyl-p-cresol as an antioxidant to stop the polymerization, and the resulting copolymer was washed and dried under vacuum. The results of the copolymerization reaction are shown in Table 6. Comparative examples containing no molecular weight regulator are also shown in Table 6.

TABLE 6

| | Mmol | | | | Polymerization | | Yield [1] (percent) | $[\eta]^2$ | Elementary analysis | | | $AN^3$ (mol percent) |
|---|---|---|---|---|---|---|---|---|---|---|---|---|
| | $EtAlCl_2$ | $VOCl_3$ | AIBN | n-$C_{12}H_{25}SH$ | Temperature (° C.) | Time (hr.) | | | C | H | N (percent) | |
| Comparative Example 4 | 0.5 | 0.05 | 0.1 | | 80 | 3 | 38.2 | 1.04 | 78.11 | 8.44 | 13.45 | 51.4 |
| Comparative Example 5 | 0.05 | 0.05 | 0.1 | | 80 | 6 | 52.6 | 1.26 | 78.35 | 8.61 | 13.04 | 49.9 |
| Example 15 | 0.05 | 0.05 | 0.1 | 0.25 | 80 | 6 | 41.7 | 0.67 | 77.80 | 8.88 | 13.32 | 50.9 |
| Example 16 | 0.05 | 0.05 | 0.1 | 0.10 | 80 | 6 | 36.2 | 0.86 | 78.11 | 8.41 | 13.49 | 51.6 |
| Example 17 | 0.05 | 0.05 | 0.1 | 0.10 | 80 | 3 | 33.9 | 0.79 | 77.86 | 9.23 | 12.91 | 49.4 |

[1] The yield was calculated based on 2 times of mole amount of smaller monomer (BD).
[2] $\eta$ is an intrinsic viscosity measured in dimethylformamide at 30° C.
[3] The acrylonitrile content in the copolymer calculated from elementary analysis value (N percent).

Comparison of the intrinsic viscosities shows that n-dodecylmercaptan is effective for depressing the molecular weight of the resulting copolymer.

Table 6 also shows found values of the elementary analysis of the resulting copolymer, and these found values agree with theoretical values (carbon: 78.46% hydrogen: 8.47%; nitrogen: 13.07%) of an alternating copolymer having a ratio of butadiene unit to acrylonitrile unit=1:1.

The resulting copolymer is a rubbery elastomer, and is dissolved completely in chloroform, methyl ethyl ketone and dimethylformamide and contains no insoluble part (gel).

The copolymer was dissolved in deuterochloroform, and NMR spectrum of the copolymer was measured at 60

TABLE 5

| Experimental number* | Catalyst system (mmol) | | | Yield (percent) | Acrylonitrile content (mol percent) | NMR | | |
|---|---|---|---|---|---|---|---|---|
| | $AlEtCl_2$ | $VOCl_3$ | AIBN | | | $F_{AB}$ | $F_{AA}$ | $F_{BB}$ |
| 14-1 | 4.0 | 0.4 | 0.4 | 23.3 | 50.2 | 78.1 | 13.7 | 7.9 |
| 14-2 | | | 1.0 | 30.7 | 50.6 | 71.2 | 10.3 | 18.4 |

* 140 mmoles of butadiene and 260 mmoles of acrylonitrile were used.

As seen from the above data, the copolymer according to the present invention is larger than the copolymer obtained by using the free radical initiator in the value of $F_{AB}$ which is a scale of alternating property. However, it can be seen that at the elevated polymerization temperature (80° C.) as described in this example, the alternating property of the obtained copolymer lowers slightly.

EXAMPLES 15–17

A beverage bottle of 100 ml. capacity was thoroughly dried and substituted with gaseous nitrogen. Into the botmegacycles. As the result, it was confirmed that there was no difference between the copolymer obtained by using the molecular weight regulator and that obtained by not using such regulator in the structure and the composition. Furthermore, the copolymer was dissolved in chloroform and formed into a film on a rock salt, and then IR spectrum of the copolymer was measured. As the result, it was also found that the structure and the composition of the resulting copolymers were entirely the same in both of the case that the molecular weight regulator was used and the case that such regulator was not used. From these facts, it has been found that the addition of the mercaptan can control the molecular weight of the resulting copolymer without changing the structure and the composition of the resulting copolymer.

EXAMPLE 18

A beverage bottle of 100 ml. capacity was thoroughly dried and substituted with gaseous nitrogen. Into the bottle were charged 100 mmoles of acrylonitrile purified by distillation, cooled to −78° C., and 4 mmoles of ethylaluminum dichloride were added thereto. Immediately, 100 mmoles of butadiene and 0.4 mmole of vanadyl trichloride were added and then 0.2 mmole of carbon tetrabromide (CBr$_4$) was added as a molecular weight regulator into the bottle, and the bottle was closed tightly. The bottle was shaken thoroughly and left to stand in a bath maintained at 0° C. 15 hours later, a small amount of methanol was added to the reaction system to stop polymerization and further the resulting copolymer was washed in methanol containing 2,.6-di-tert-butyl-p-cresol as an antioxidant and dried under vacuum. As a control, a copolymerization reaction was effected in the same manner and recipe as described above except using no molecular weight regulator. These polymerization results are shown in the following Table 7.

and was formed into a film on a rock salt plate and the IR spectrum of the copolymer was measured, and it was found that the resulting products were the copolymers having the same structure. The microstructure value in the butadiene unit of both the copolymers measured by Morero's method was 98.0% of trans-1,4 bond, 2.0% of 1,2-bond and 0% of cis-1,4 bond.

As described above, the obtained copolymers were stereo-specific alternating copolymers, wherein substantially the whole butadiene units were bonded in trans-1,4 type.

According to the elementary analysis of the copolymers in Example 18 and Comparative Example 6, found values of carbon were 78.47% and 78.46%, those of hydrogen 8.40% and 8.44%, and those of nitrogen 13.13% and 13.10%, respectively. These found values agreed well with the theoretical values (carbon: 78.46%; hydrogen: 8.47%; nitrogen: 13.07%) of alternating copolymer containing the same moles of butadiene and acrylonitrile.

From the above description, it can be seen that by adding carbon polyhalide, the molecular weight of the resulting copolymer can be controlled without changing the structure and the composition.

TABLE 7

|  | Mmol | | | Polymerization | | | |
| --- | --- | --- | --- | --- | --- | --- | --- |
|  | EtAlCl$_2$ | VOCl$_3$ | CBr$_4$ | Temperature (° C.) | Time (hr.) | Yield [1] (percent) | $[\eta]$ [2] |
| Example 18 | 4 | 0.4 | 0.2 | 0 | 15 | 57.0 | 0.49 |
| Comparative Example 6 | 4 | 0.4 |  | 0 | 15 | 63.7 | 0.70 |

[1] Yield based on total amount of monomers.
[2] Measured in dimethylformamide at 30° C.

From the comparison of the intrinsic viscosities, it can be seen that carbon tetrabromide has an effect for controlling the molecular weight of the resulting copolymer.

Both of the resulting copolymers were rubbery elastomers, and were dissolved in chloroform, methyl ethyl ketone and dimethylformamide and contained no insoluble part (gel).

The copolymer was dissolved in deuterochloroform, and NMR spectrum of the copolymer was measured at 60 megacycles.

As a control, NMR spectrum was measured with respect to a conventional random copolymer having a known acrylonitrile content under the same conditions. As the result, it was confirmed that the composition of the copolymer can be determined from the ratio of the area of NMR spectrum of the methine proton in butadiene unit to the area of NMR spectrum of the methine proton of acrylonitrile unit and the methylene proton of acrylonitrile unit and butadiene unit. In this way, the composition of the resulting copolymers were identified.

As the result, it was found that the acrylonitrile contents in Example 18 and Comparative Example 6 were 50.1 mol percent and 50.2 mol percent, respectively. That is, the resulting copolymers were alternating copolymers having a molar ratio of butadiene and acrylonitrile of 1:1. Furthermore, it was found that the resulting copolymers were stereospecific copolymers having the same structure by checking chemical shifts of NMR spectra.

Moreover, the copolymer was dissolved in chloroform

EXAMPLES 19–36

A beverage bottle of 100 ml. capacity was dried thoroughly and substituted with gaseous nitrogen. Into the bottle was charged 0.04 mmole of azobisisobutyronitrile and cooled to −78° C., after which 0.2 mmole of ethylaluminum dichloride was added thereto. Then the bottle was charged with 533 mmoles of acrylonitrile, 100 mmoles of butadiene, 0.02 mmole of vanadyl trichloride and further a given amount of various molecular weight regulators as shown in the following Table 8, and then closed tightly. Thereafter, the bottle was shaken in a thermostat maintained at 80° C. to effect polymerization for a given time. Then, the bottle was opened and the resulting product was poured in methanol containing 2,6-di-tert-butyl-p-cresol as an antioxidant to stop the polymerization, and the resulting copolymer was washed and dried under vacuum. The obtained results are shown in Table 8 together with that of the case containing no molecular weight regulator (Comparative Example 7). From the values of the intrinsic viscosity in dimethylformamide at 30° C. shown in Table 8, it can be seen that the molecular weight of the resulting copolymer is considerably lowered by adding thiol compound, disulfide compound or carbon polyhalide.

The obtained copolymers were rubbery elastomer, and were dissolved completely in chloroform, methyl ethyl ketone and dimethylformamide and contained no insoluble part (gel).

TABLE 8

| | Mmol | | | Regulator | Molecular weight | Polymerization | | Yield [1] (percent) | $[\eta]$ [2] |
|---|---|---|---|---|---|---|---|---|---|
| | EtAlCl$_2$ | VOCl$_3$ | AIBN | | | temperature (° C.) | Time (hr.) | | |
| Comparative Example 7 | 0.2 | 0.02 | 0.04 | | | 80 | 3 | 52.7 | 4.02 |
| Example: | | | | | | | | | |
| 19 | 0.2 | 0.02 | 0.04 | t-C$_{12}$H$_{25}$SH | 0.1 | 80 | 3 | 52.5 | 1.64 |
| 20 | 0.2 | 0.02 | 0.04 | t-C$_{12}$H$_{25}$SH | 0.2 | 80 | 3 | 44.3 | 1.26 |
| 21 | 0.2 | 0.02 | 0.04 | t-C$_{12}$H$_{25}$SH | 0.4 | 80 | 3 | 40.3 | 1.14 |
| 22 | 0.2 | 0.02 | 0.04 | t-C$_{12}$H$_{25}$SH | 0.4 | 80 | 6 | 55.8 | 1.55 |
| 23 | 0.2 | 0.02 | 0.04 | n-C$_{12}$H$_{25}$SH | 0.1 | 80 | 3 | 43.8 | 1.03 |
| 24 | 0.2 | 0.02 | 0.04 | n-C$_{12}$H$_{25}$SH | 0.2 | 80 | 3 | 32.7 | 0.89 |
| 25 | 0.2 | 0.02 | 0.04 | n-C$_{12}$H$_{25}$SH | 0.4 | 80 | 3 | 28.0 | 0.64 |
| 26 | 0.2 | 0.02 | 0.04 | n-C$_{12}$H$_{25}$SH | 0.4 | 80 | 6 | 48.5 | 0.79 |
| 27 | 0.2 | 0.02 | 0.04 | n-C$_{16}$H$_{33}$SH | 0.1 | 80 | 3 | 47.9 | 1.54 |
| 28 | 0.2 | 0.02 | 0.04 | n-C$_{16}$H$_{33}$SH | 0.2 | 80 | 3 | 44.7 | 1.25 |
| 29 | 0.2 | 0.02 | 0.04 | n-C$_{16}$H$_{33}$SH | 0.4 | 80 | 3 | 40.0 | 0.87 |
| 30 | 0.2 | 0.02 | 0.04 | n-C$_{16}$H$_{33}$SH | 0.4 | 80 | 6 | 66.5 | 2.54 |
| 31 | 0.2 | 0.02 | 0.04 | (tert-C$_4$H$_9$)$_2$S$_2$ | 0.4 | 80 | 3 | 46.7 | 2.32 |
| 32 | 0.2 | 0.02 | 0.04 | (tert-C$_4$H$_9$)$_2$S$_2$ | 0.4 | 80 | 6 | 66.5 | 2.54 |
| 33 | 0.2 | 0.02 | 0.04 | CBr$_4$ | 0.1 | 80 | 3 | 53.4 | 1.31 |
| 34 | 0.2 | 0.02 | 0.04 | CBr$_4$ | 0.2 | 80 | 3 | 46.4 | 1.04 |
| 35 | 0.2 | 0.02 | 0.04 | CBr$_4$ | 0.4 | 80 | 3 | 41.4 | 0.78 |
| 36 | 0.2 | 0.02 | 0.04 | CHBr$_3$ | 0.4 | 80 | 3 | 48.7 | 1.78 |

[1] Calculated based on 2 times of mole amount of the smaller monomer (BD).
[2] Intrinsic viscosity measured in dimethylformamide at 30° C.

Furthermore, it has been found from elementary analysis, NMR spectrum and IR spectrum that the addition of the molecular weight regulator has no influence on the structure and the composition of the resulting copolymer. Namely, it has been found that all the copolymers are stereospecific alternating copolymers, in which the ratio of butadiene unit to acrylonitrile unit is substantially 1:1 and the butadiene units are bonded substantially in trans-1,4 type.

EXAMPLE 37

A copolymerization reaction was effected in the same manner as described in Example 15 except that a given amount of iodoform (CHI$_3$) was used as a molecular weight regulator. The results are shown in the following Table 9.

TABLE 9

| Experimental number | CHI$_3$ (mmol) | Yield (percent) | Acrylonitrile (mol percent) | $[\eta]$ |
|---|---|---|---|---|
| 37-1 | | 39.5 | 52.9 | 1.39 |
| 37-2 | 0.01 | 35.7 | 52.1 | 1.32 |
| 37-3 | 0.05 | 37.2 | 51.8 | 0.99 |
| 37-4 | 0.10 | 37.5 | 52.5 | 0.89 |

From the above data, it can be seen that iodoform has an effect for regulating the molecular weight of the resulting copolymer.

EXAMPLE 38

Into a beverage bottle of 100 ml. capacity were charged 100 mmoles of acrylonitrile, 100 mmoles of butadiene, a reaction product of 0.67 mmole of triethylaluminum and 1.33 mmoles of aluminum trichloride, given amounts of vanadyl trichloride and di-tert-butyl disulfide, after which the bottle was closed tightly and a copolymerization reaction was effected at 25° C. for 24 hours. The obtained results are shown in the following Table 10.

TABLE 10

| Experimental number | t-Bu$_2$S$_2$ (mmol) | Yield (percent) | $[\eta]$ |
|---|---|---|---|
| 38-1 | 0 | 29.9 | 1.03 |
| 38-2 | 0.1 | 22.8 | 0.81 |
| 38-3 | 0.2 | 25.9 | 0.76 |
| 38-4 | 1.0 | 24.4 | 0.75 |

It can be see from the above data that di-tert-butyl disulfide has an effect for regulating the molecular weight of the resulting copolymer.

EXAMPLE 39

A beverage bottle of 100 ml. capacity was thoroughly dried, substituted with gaseous nitrogen and cooled to —78° C. Into the bottle were charged 100 mmoles of acrylonitrile purified by distillation and 4 mmoles of triethylaluminum. The bottle was further charged with 100 mmoles of liquid butadiene cooled to —78° C. 0.4 mmole of vanadyl trichloride and 4 mmoles of stannic chloride in this order, after which the bottle was closed tightly and a copolymerization reaction was effected at 0° C. for 3 hours. Thereafter, a small amount of methanol was added to the reaction system to stop the copolymerization, and then the resulting copolymer was washed with methanol containing 2,6-di-tert-butyl-p-cresol as an antioxidant and dried under vacuum. The obtained copolymer was a rubbery elastomer and the yield was 34,7% based on the total amount of the monomers. The resulting copolymer was dissolved in chloroform, methyl ethyl ketone and dimethylformamide and contained no insoluble part (gel). The intrinsic viscosity in dimethylformamide at 30° C. was 0.75.

The copolymer was dissolved in deuterochloroform, and NMR spectrum of the copolymer was measured at 60 megacycles.

As a control, NMR spectrum was measured with respect to a random copolymer having a known acrylonitrile content under the same conditions. As the result, it was confirmed that the composition of the copolymer can be determined from the ratio of the area of NMR spectrum of the methine proton in butadiene unit to the area of NMR spectrum of the methine proton of acrylonitrile unit and the methylene proton of acrylonitrile unit and butadiene unit. In this way, the composition of the resulting copolymer was identified.

As the result, it was found that the content of acrylonitrile unit was 50.1 mol percent. That is, the resulting copolymer was composed of the same mole amount of butadiene unit and acrylonitrile unit and the composition was 1:1.

Furthermore, it was found that the copolymer contained neither homopolymer nor block polymer by checking chemical shifts and had a good stereospecific property from the simplicity and the sharpness of NMR spectrum. The above-mentioned facts obtained by the NMR spectrum show that the copolymer is an alternating copolymer having a good stereospecific property.

Moreover, the copolymer was dissolved in chloroform and formed into a film on a rock salt plate and the IR spectrum of the copolymer was measured. The characteristic absorption band of nitrile group in the acrylonitrile unit and that of trans-1,4 bond in the butadiene unit were observed apparently at 2,240 cm.$^{-1}$ and 973 cm.$^{-1}$ respectively. The characteristic absorption band of 1,2-bond in the butadiene unit was negligible and that of cis-1,4 bond was not substantially observed. The microstructure value measured by Morero's method was 97.0% of trans-1,4 bond, 3.0% of 1,2-bond and 0% of cis-1,4 bond.

As described above, the obtained copolymer was a stereospecific alternating copolymer, wherein substantially the whole butadiene units were bonded in trans-1,4 type.

According to the elementary analysis, found value of carbon was 78.45%, that of hydrogen 8.38%, and that of nitrogen 13.17%. These found values agreed with the theoretical values (carbon: 78.45%, hydrogen: 8.47%, nitrogen: 13.08%) of alternating copolymer composed of 1:1 units of butadiene and acrylonitrile.

COMPARATIVE EXAMPLE 8

A copolymerization reaction was effected in the same manner as described in Example 39 except that stannic chloride was not used and the polymerization time was 24 hours. As the result, substantially no copolymer was obtained.

COMPARATIVE EXAMPLE 9

A copolymerization reaction was effected in the same manner as described in Example 39 except that vanadyl trichloride was not used and the polymerization time was 24 hours.

The yield of the resulting copolymer was 0.9% based on the total amount of the monomers. The obtained copolymer was a gel and was not substantially dissolved in chloroform, methyl ethyl ketone and dimethylformamide.

The above-mentioned facts show that the catalyst system according to the present invention has a surprisingly excellent polymerization activity as compared with the catalyst system combined triethylaluminum and stannic chloride and gives an alternating copolymer containing substantially no gel.

COMPARATIVE EXAMPLE 10

A copolymerization reaction was effected in the same manner as described in Example 39 except that 4.0 mmoles of a reaction product of the same moles of triethylaluminum and stannic chloride (hereinafter abridged as $Et_3Al$-$SnCl_4$) was added to the polymerization system instead of adding triethylaluminum and stannic chloride to the system in the presence of the monomers and the polymerization time was 28 hours.

The $Et_3Al$-$SnCl_4$ was obtained by reacting 1 mole/l. of triethylaluminum with 1 mole/l. of stannic chloride in hexane at −78° C. and then aging the resulting product at room temperature for 1 day. The addition order at the copolymerization was acrylonitrile, butadiene, vanadyl trichloride and $Et_3Al$-$SnCl_4$. The yield of the resulting copolymer was 1.2%, so that the catalyst system had an extremely low activity. This fact shows that the catalyst system according to the present invention is essentially different from a catalyst system combined a reaction product of alkylaluminum and tin halide only with a transition metal compound. That is, it can be seen that by mixing and reacting three components in the presence of the monomers, a catalyst system having higher polymerization activity, which has never been expected, can be obtained.

EXAMPLE 40

A copolymerization reaction was effected in the same manner as described in Example 39 except that 4 mmoles of canadyl trichloride were used (Al/V=1/1 (molar ratio)) and the polymerization time was 24 hours. The resulting copolymer was a rubbery elastomer containing no gel and the yield was 22.0%. It was confirmed from IR spectrum, NMR spectrum and the like that the copolymer was an alternating copolymer. According to elementary analysis of the obtained copolymer, found value of carbon was 78.26%, that of hydrogen 8.53% and that of nitrogen 13.21%, so that these values agreed with the theoretical values (carbon: 78.45%, hydrogen: 8.47%, nitrogen: 13.08%) of alternating copolymer composed of 1:1 units of butadiene and acrylonitrile.

EXAMPLE 41

A copolymerization reaction was effected in the same manner as described in Example 39 except that 2 mmoles of stannic chloride were used and the polymerization time was 15 hours. The resulting copolymer was a rubbery elastomer containing no gel and the yield was 41.2%. It was confirmed from IR spectrum, NMR spectrum and elementary analysis that the obtained copolymer was an alternating copolymer. According to elementary analysis, found value of carbon was 78.00%, that of hydrogen 9.08% and that of nitrogen 12.92%.

EXAMPLE 42

A copolymerization reaction was effected in the same manner as described in Example 39 except that 1 mmole of stannic chloride was used and the polymerization time was 15 hours. The resulting copolymer was a rubbery elastomer containing no gel and the yield was 37.6%. It was confirmed from IR spectrum, NMR spectrum and elementary analysis that the obtained copolymer was an alternating copolymer. According to elementary analysis, found value of carbon was 78.87%, but of hydrogen 8.19% and that of nitrogen 12.94%.

EXAMPLE 43

A copolymerization reaction was effected in the same manner as described in Example 39 except that 8 mmoles of triethyltin monochloride were used instead of stannic chloride and the polymerization time was 24 hours. The resulting copolymer was a rubbery elastomer containing no gel and the yield was 36.4%. It was confirmed from IR spectrum, NMR spectrum and elementary analysis that the obtained copolymer was an alternating copolymer. According to elementary analysis, found value of carbon was 77.80%, that of hydrogen 8.81% and that of nitrogen 13.39%.

EXAMPLE 44

A copolymerization reaction was effected in the same manner as described in Example 39 except that 100 mmoles of butadiene and 300 mmoles of acrylonitrile were used and the polymerization time was 15 hours. The resulting copolymer was a rubbery elastomer containing no gel and the yield was 26.3%. It was confirmed from IR spectrum, NMR spectrum and elementary analysis that the obtained copolymer was an alternating copolymer. According to elementary analysis, found value of carbon was 78.23%, that of hydrogen 8.65% and that of nitrogen 13.11%, so that these values agreed with the theoretical values of alternating copolymer composed of 1:1 units of butadiene and acrylonitrile.

EXAMPLE 45

Into a beverage bottle of 100 ml. capacity were charged 100 mmoles of acrylonitrile and 100 mmoles of butadiene and cooled to −78° C. Then the bottle was charged with 4.0 mmoles of triethyl-aluminum, 2.0 mmoles of stannic chloride and 0.4 mmole of vanadyl trichloride, after which the bottle was closed tightly and a copolymerization reaction was effected at 60° C. for 3 hours. As a control the same experiment was effected with respect to a system containing further 0.4 mmole of azobisisobutyronitrile in the system as described above. The obtained results are shown in the following Table 11.

TABLE 11

| Experimental number | Additive | Mmol | Yield (percent) | Acrylonitrile content (mol percent) |
|---|---|---|---|---|
| 45-1 | | | 38.2 | 48.8 |
| 45-2 | Azobisisobutyronitrile | 0.4 | 46.2 | 48.2 |

COMPARATIVE EXAMPLE 11

A copolymerization reaction was effected at 60° C. for 24 hours in the same manner as described in Example 45 except that 10 mmoles of stannic chloride and 1.0 mmole of vanadyl trichloride were used and an organoaluminum compound was not used. The yield of the obtained copolymer was 13.7%. According to elementary analysis, found value of nitrogen in the copolymer was 8.42%, so that it has been found that this value was considerably different from the theoretical value of nitrogen in the alternating copolymer (13.07%).

EXAMPLE 46

A copolymerization reaction was effected at 0° C. for 3 hours in the same manner as described in Example 45 except that ethylaluminum sesquichloride or diethylaluminum chloride was used instead of triethylaluminum.

The obtained results are shown in the following Table 12.

TABLE 12

| Experimental number | Al- component | Mmol | SnCl$_4$ (mmol) | VOCl$_3$ (mmol) | Yield (percent) | Acrylonitrile content (mol percent) |
|---|---|---|---|---|---|---|
| 46-1 | AlEt$_{1.5}$Cl$_{1.5}$ | 4.0 | 1.0 | 0.4 | 35.0 | 49.7 |
| 46-2 | AlEt$_2$Cl | 4.0 | 1.0 | 0.4 | 38.1 | 50.2 |
| 46-3 | AlEt$_2$Cl | 4.0 |  | 0.4 | 21.2 | 48.7 |

EXAMPLE 47

Into a beverage bottle of 100 ml. capacity were charged 533 mmoles of acrylonitrile, 100 mmoles of butadiene, 1.0 mmole of triethylaluminum, 0.5 mmole of stannic chloride, 0.1 mmole of vanadyl trichloride and further 0.2 mmole of azobisisobutyronitrile as an additive at −78° C. under nitrogen atmosphere, after which a copolymerization reaction was effected at 80° C. for 3 hours. The obtained results are shown in the following Table 13.

TABLE 13

| Experimental number | Additive | (Mol) | Yield (percent) |
|---|---|---|---|
| 47-1 |  |  | 18.2 |
| 47-2 | Azobisisobutyronitrile | 0.2 | 38.8 |

EXAMPLE 48

Into a beverage bottle of 100 ml. capacity were charged 100 mmoles of purified acrylonitrile and 100 mmoles of butadiene at −78° C. under nitrogen atmosphere and further charged 4.0 mmoles of triethylauminum, 0.4 mmole of vanadyl trichloride and 8 mmoles of triethyltin monochloride, after which the bottle was closed tightly and a copolymerization reaction was effected at 40° C. for 20 hours. A rubbery elastomer containing substantially no gel was obtained in a yield of 23.7%. Elementary analysis showed that the acrylonitrile content was 49.9 mol percent. It was confirmed from NMR spectrum at 100 megacycles that the obtained copolymer was an alternating copolymer composed of 1:1 units of butadiene and acrylonitrile.

EXAMPLE 49

A coplymerization reaction was effected under the same conditions as described in Example 48 except that methyl methacrylate was used instead of acrylonitrile. The obtained copolymer was a rubbery elastomer containing no gel and the yield was 27.7%. The content of methyl methacrylate was 52.9% mol percent from elementary analysis.

EXAMPLE 50

A beverage bottle of 100 ml. capacity was thoroughly desired, dried and filled with purified nitrogen. Into the bottle were charged 1.36 g. (10 mmoles) of zinc chloride and dried under vacuum at 300° C. for 30 minutes to obtain anhydrous zinc chloride (hereinafter, thus heat-treated zinc chloride is called as anhydrous zinc chloride), which was cooled to room temperature and mixed with 2 ml. of 1 mole/l. solution of triethylaluminum in toluene (2 mmoles of triethylaluminum). Then, 6.6 ml. (100 mmoles) of acrylonitrile were charged into the bottle and the resulting mixture was cooled to −78° C., and added with 5.4 g. (100 mmoles) of butadiene and then 0.47 ml. (5 mmoles) of vanadyl trichloride, after which the bottle was left to stand at 0° C. for 16 hours to effect a polymerization reaction. Then a large amount of 5% solution of 2,6-di-tert-butyl-p-cresol in methanol was added to the copolymerization system to stop the reaction and to precipitate the resulting copolymer. The precipitate was dried under vacuum in a conventional manner.

The obtained copolymer was a tough elastomer. The yield was 63.2%. The obtained copolymer was dissolved in dimethylformamide, chloroform, tetrahydrofuran, acetonitrile and nitrobenzene, and contained substantially no gel.

The intrinsic viscosity of the copolymer in dimethylformamide at 30° C. was 0.9.

The copolymer was dissolved in deuterochloroform, and NMR spectrum of the copolymer was measured at 60 megacycles.

As a control, NMR spectrum was measured with respect to a conventional random copolymer having a known acrylonitrile content under the same conditions. As the result, it was confirmed that the composition of the copolymer can be determined from the ratio of the area of NMR spectrum of the methine proton of acrylonitrile unit and the methylene proton of acrylonitrile unit and butadiene unit. In this way, the composition of the resulting copolymer was identified.

As the result, is was found that the content of acrylonitrile unit was 50.7 mol percent. That is, the resulting copolymer was composed of the same mole amount of butadiene unit and acrylonitrile unit and the composition was 1:1.

Furthermore, it was found that the copolymer contained neither homopolymer nor block polymer by checking chemical shifts and had a good stereospecific property from the simplicity and the sharpness of NMR spectrum. The above-mentioned facts obtained by the NMR spectrum show that the copolymer is an alternating copolymer having a good stereospecific property.

Moreover, a film of the copolymer was formed on a rock salt plate and the IR spectrum of the copolymer was measured. The characteristic absorption band of nitrile group in the acrylonitrile unit and that of trans-1,4 bond in the butadiene unit were observed apparently at 2,240 cm.$^{-1}$ and 973 cm.$^{-1}$ respectively. The characteristic absorption band of 1,2-bond in the butadiene unit was negligible and that of cis-1,4 bond was not substantially observed. The microstructure value measured by Morero's method was 97% of trans-1,4 bond, 3% of 1,2-bond and 0% of cis-1,4 bond.

As described above, the obtained copolymer was a high molecular weight rubbery elastic copolymer containing substantially no part insoluble in dimethylformamide, and was a stereospecific alternating copolymer, wherein substantially the whole butadiene units were bonded in trans-1,4 cype. According to the elementary analysis, found value of carbon was 78.24%, that of hydrogen 8.41%, and that of nitrogen 13.36%. In the theoretical values of alternating copolymer containing the same moles of butadiene and acrylonitrile, carbon is 78.45%, hydrogen 8.47%, and nitrogen 13.08%, so that the found values agree with the theoretical values well.

COMPARATIVE EXAMPLE 12

A copolymerization reaction was effected at 60° C. for 22 hours in the same manner as described in Example 50 except using no triethylaluminum. The yield of the obtained copolymer was 21.2%. Therefore, it can be seen that by using a small amount of triethylaluminum the activity of the catalyst is improved considerably.

EXAMPLES 51–53

A copolymerization reaction was effected in the same manner as described in Example 50 except that the amount of triethylaluminum to be used was varied. The experimental results are shown in the following Table 14.

TABLE 14

| Example number | Amount of triethylaluminum used (mmol) | Yield (percent) | Intrinsic viscosity [η] |
|---|---|---|---|
| 51 | 0.5 | 24.5 | 0.8 |
| 52 | 1 | 56.1 | 1.1 |
| 53 | 2 | 48.2 | 0.9 |

It was confirmed from NMR spectrum, IR spectrum, elementary analysis and solubility that the obtained copolymer was a stereospecific alternating copolymer wherein the butadiene units were bonded trans-1,4 type.

EXAMPLES 54–59

A copolymerization reaction was effected in the same manner as described in Example 50 except that the amount of vanadyl trichloride to be used was varied. The experimental results are shown in the following Table 15.

TABLE 15

| Example number | Amount of vanadyl trichloride used (mmol) | Yield (percent) | Intrinsic viscosity [η] |
|---|---|---|---|
| 54 | 0.5 | 12.1 | 1.3 |
| 55 | 1 | 15.1 | 1.2 |
| 56 | 2 | 6.5 | 0.8 |
| 57* | 3 | 30.1 | 1.2 |
| 58* | 5 | 38.3 | 0.8 |
| 59* | 10 | 25.6 | 0.7 |

*A copolymerization reaction was effected at 0° C. for 5 hours.

Elementary analysis showed that the obtained rubbery elastomer was an alternating copolymer.

EXAMPLES 60–63

A series of experiments were effected in the same manner as described in Example 50, except that the total amount of the catalyst used was varied, to obtain a result shown in the following Table 16. In this case, the catalyst used was a three-component catalyst having the following composition.

Vanadyl trichloride/zinc chloride (molar ratio): 0.5/1
Triethylaluminum/zinc chloride (molar ratio): 0.2/1
A copolymerization reaction was effected at 0° C. for 5 hours.

TABLE 16

| Example number | Amount of catalyst used [1] (mol) | Yield (percent) |
|---|---|---|
| 60 | 0.0043 | 6.5 |
| 61 | 0.0085 | 3.8 |
| 62 | 0.0425 | 7.2 |
| 63 | 0.0850 | 38.8 |

[1] Based on 1 mole of total feed monomer.

It has been found that the obtained rubbery elastomer was an alternating copolymer.

EXAMPLES 64–66

A series of experiments were effected in the same manner as described in Example 50, except that the polymerization temperature was varied, to obtain a result shown in the following Table 17. In this case, the polymerization time was 1 hour.

TABLE 17

| Example number | Polymerization temperature (° C.) | Yield (percent) | Intrinsic viscosity [η] |
|---|---|---|---|
| 64 | 18 | 59.9 | |
| 65 | 40 | 35.0 | 1.0 |
| 66 | 80 | 47.5 | 0.8 |

The obtained rubber elastomer contained gel (insoluble part in methyl ethyl ketone) as the polymerization temperature is high, but it was confirmed from elementary analysis, and NMR spectrum and IR spectrum of the soluble part that said elastomer was an alternating copolymer.

EXAMPLES 67–70

A series of experiments were effected in the same manner as described in Example 50, except that preparation order of the catalyst and feed order of the monomers were varied, to obtain a result shown in the following Table 18.

TABLE 18

| Example number | Addition order | Yield (percent) |
|---|---|---|
| 67 | ZnCl₂ room temperature → AlEt₃ room temperature → VOCl₃ room temperature → AN −78° C. → BD | 8.7 |
| 68 | ZnCl₂·AN room temperature → AlEt₃ −78° C. BD −78° C. → VOCl₃ | 40.6 |
| 69 | ZnCl₂·AN −78° C. BD −78° C. → AlEt₃ −78° C. → VOCl₃ | 43.4 |
| 70 | AlEt₃ room temperature → VOCl₃ room temperature → ZnCl₂·AN −78° C. BD | 13.1 |

NOTE.—AN=Acrylonitrile; AlEt₃=Triethylaluminum; ZnCl₂=Anhydrous zinc chloride; BD=Butadiene; VOCl₃=Vanadyl trichloride; ZNCl₂·AN=Zinc chloride/acrylonitrile complex solution.

The term "zinc chloride/acrylonitrile complex solution" used herein means one prepared as follows:

A flask of 100 ml. capacity was thoroughly deaired, dried and filled with purified nitrogen. Into the flask were charged 13.6 g. (100 mmoles) of zinc chloride and dried to obtain anhydrous zinc chloride, to which were added 66 ml. (1 mole) of acrylonitrile. The resulting mixture was heated and stirred at 60° C. for several hours, whereby said zinc chloride was complexed with acrylonitrile and dissolved.

8.8 ml. of said zinc chloride/acrylontrile complex solution was used for the copolymerization reaction. The reaction was effected at 0° C. for 3 hours.

As seen from Table 18, it is preferable that triethylaluminum is contacted with vanadyl trichloride in the presence of acrylonitrile.

EXAMPLE 71

At room temperature, 8.8 ml. of zinc chloride/acrylonitrile complex solution (10 mmoles of zinc chloride, 100 mmoles of acrylonitrile) were added and mixed with 2 ml. of 1 mole/l. solution of triethylaluminum in toluene (2 mmoles of triethylaluminum). The resulting mixture was added with 5.4 g. (100 mmoles) of butadiene and 2.5 ml. (0.25 mmole) of 0.1 mole/l. solution of vanadyl trichloride in toluene at −78° C., after which a copolymerization reaction was effected at 0° C. for 20 hours. A rubbery elastomer was obtained in a yield of 9.3%, and the intrinsic viscosity of the elastomer was 0.8. It was confirmed from NMR spectrum, IR spectrum and elementary analysis that the elastomer was an alternating copolymer.

EXAMPLE 72

A copolymerization reaction was effected at 0° C. for 1 hour in the same manner as described in Example 50 except that diethylzinc was used instead of triethylaluminum. The yield was 27.3%, and the obtained rubbery elastomeric copolymer contained substantially no gel and had an intrinsic viscosity of 1.2. It was confirmed from NMR spectrum and IR spectrum that the obtained copolymer was a stereospecific alternating copolymer in which the butadiene unit had 98% of trans-1,4-bond, 2% of 1,2-bond and 0% of cis-1,4 bond. According to the elementary analysis, found value of carbon was 77.92%, that of hydrogen 8.44% and that of nitrogen 13.64% and these values agreed with the theoretical values of alternating copolymer well, which showed that the copolymer was an alternating copolymer.

ponents (B–3–a) and (B–3–b) in the catalyst were varied, to obtain a result as shown in the following Table 21. In this example, the following recipe was used.

Recipe:                                           Mmoles
  Acrylonitrile _____ 100
  Butadiene _____ 100
  Vanadyl trichloride _____ 3
  Component (B–3–b) _____ 10
Polymerization condition, 0° C., 15 hours.

TABLE 21

| Experimental number | Component (B-3-b) | Component (B-3-a) | Mmol | Yield (percent) |
|---|---|---|---|---|
| 80-1 | Zinc chloride | Ethylaluminum dichloride | 1 | 20.6 |
| 80-2 | Aluminum chloride | Diethylzinc | 1 | ¹10.2 |
| 80-3 | do | do | 2 | ¹9.3 |
| 80-4 | do | do | 5 | ¹58.0 |
| 80-5 | Gallium chloride | Triethylaluminum | 2 | ¹11.2 |
| 80-6 | Cadmium chloride | do | 1 | ¹36.3 |
| 80-7 | do | do | 2 | ¹28.9 |
| 80-8 | do | do | 3 | ¹25.1 |
| 80-9 | Mercuric chloride | do | 3 | ¹11.1 |
| 80-10 | Beryllium chloride | do | 2 | ²40.2 |
| 80-11 | Zinc chloride | Diethylberyllium | 2 | 9.5 |
| 80-12 | do | Diethylcadmium | 2 | 34.6 |
| 80-13 | do | Triethylboron | 2 | 60.7 |
| 80-14 | Magnesium chloride | Triethylaluminum | 2 | 34.1 |
| 80-15 | Calcium chloride | do | 2 | 41.9 |
| 80-16 | Cadmium chloride | Diethylcadmium | 2 | 5.0 |

¹ The reaction was effected at 0° C. for 20 hours.
² The reaction was effected at 0° C. for 72 hours.

EXAMPLES 73–74

A series of experiments were made in the same manner as described in Example 72, except that the amount of diethylzinc used was varied, to obtain a result as shown in the following Table 19.

TABLE 19

| Example number | Amount of diethylzinc used (mmol) | Yield (percent) |
|---|---|---|
| 73 | 1 | 17.8 |
| 74 | 5 | 14.1 |

It was confirmed from NMR spectrum, IR spectrum and elementary analysis that the obtained rubbery elastomer was an altenating copolymer.

EXAMPLES 75–79

To 8.8 ml. of zinc chloride/acrylonitrile complex solution were added 2 ml. (2 mmoles) of 1 mol/l. solution of diethlzinc in toluene at room temperature, and the resulting mixture was mixed and cooled to −78° C. and thereafter was added with 5.3 g. (100 mmoles) of butadiene and 0.29 ml. (3 mmoles) of vanadyl trichloride, after which a copolymerization reaction was effected for 2 hours. The copolymerization reactions were effected at various temperatures to obtain as shown in the following Table 20.

TABLE 20

| Example number | Polymerization temperature (° C.) | Yield (percent) |
|---|---|---|
| 75 | −78 | 13.1 |
| 76 | 0 | 41.1 |
| 77 | 18 | 43.9 |
| 78 | 40 | 37.4 |
| 79 | 80 | 56.2 |

The formation of gel was observed at high polymerization temperature, but is was confirmed from elementary analysis, and NMR spectrum and IR spectrum of the soluble part that the obtained copolymer was an alternating copolymer. Furthermore, it was found that the alternating copolymerization reaction smoothly progressed at a low temperature of as low as −78° C.

EXAMPLE 80

A series of experiments were made in the same manner as described in Example 50, except that kinds of com- The resulting products were rubbery elastomers and it was confirmed from NMR spectrum, IR spectrum and elementary analysis that the products were alternating copolymers.

EXAMPLE 81

Into a beverage bottle of 100 ml. capacity were charged 200 mmoles of purified acrylonitrile, 100 mmoles of butadiene, 4.0 mmoles of zinc chloride/acrylonitrile complex solution prepared in Example 67, 1.0 mmole of ethylaluminum dichloride and 0.25 mmole of vanadyl trichloride in this order at −78° under nitrogen atmosphere and then the bottle was closed tightly. A compolymerization reaction was effected at 0° C. for 24 hours to obtain a rubbery elastomer containing substantially no gel in a yield of 43.3%. Elementary analysis showed that the acrylonitrile content was about 49 mol percent, and it was found from the chart of NMR spectrum at 100 megacycles that the obtained elastomer was a complete alternating copolymer containing substantially no acrylonitrile- acrylonitrile bond and butadiene-butadiene bond.

When the similar experiment was effected using no zinc chloride/acrylonitrile complex solution, the yield was only 11.9%.

EXAMPLE 82

Figure 4:
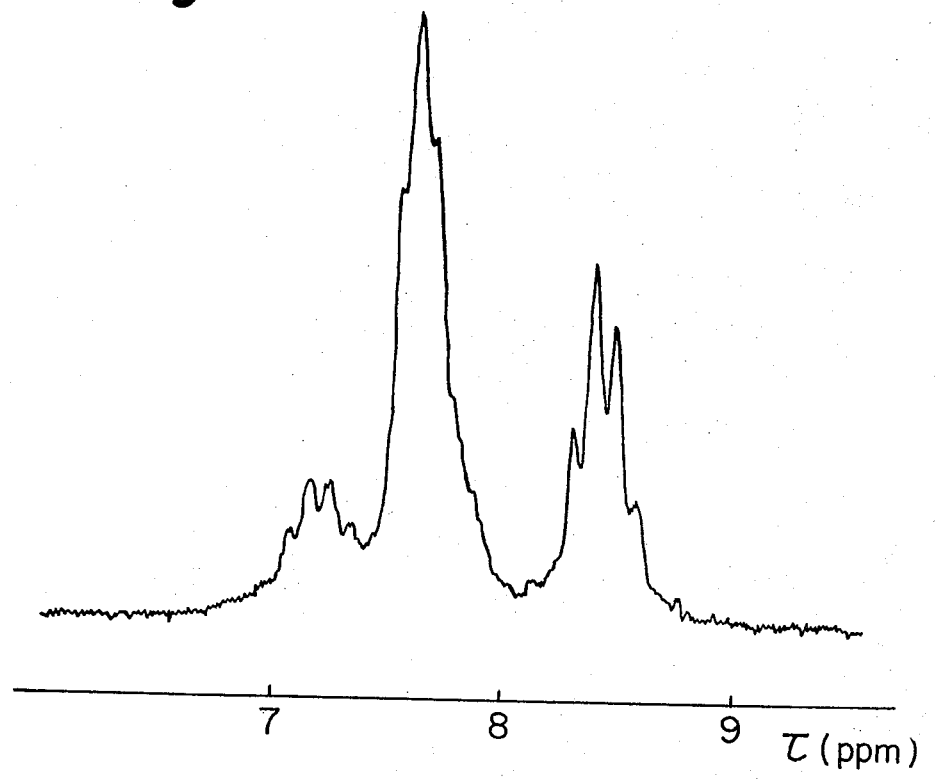
FIG. 4 is a nuclear magnetic resonance spectrum diagram of butadiene/acrylonitrile copolymer in the following Example 82.

A copolymerization reaction was effected at 20° C. for 20 hours in the same manner as described in Example 81 except that 2.8 mmoles of zinc chloride/acrylonitrile complex, 1.2 mmoles of ethylaluminum dichloride and 0.2 mmole of vanadyl trichloride were used and the composition of the monomers was the same as that of Example 81. The rubbery elastomer containing no gel was obtained in a yield of 61.4%. The chart of NMR spectrum at 100 megacycles of the elastomer is shown in FIG. 4. It can be seen from FIG. 4 that the elastomer is a substantially complete alternating copolymer.

EXAMPLE 83

According to the same manner as described in Example 82, 100 mmoles of acrylonitrile, 100 mmoles of butadiene, 10 mmoles of zinc chloride/acrylonitrile complex, 2.0 mmoles of triethylaluminum and 5.0 mmoles of various metal compounds were charged into the bottle cooled to −78° C. after which a copolymerization reaction was effected at 0° C. for 24 hours.

The obtained results are shown in the following Table 22.

TABLE 22

| Experimental number | Metal compound | Yield (percent) |
|---|---|---|
| 83-1 | Vanadium tetrachloride | 11.4 |
| 83-2 | Tri-tert-butyl orthovanadate | 27.3 |
| 83-3 | Vanadyl dichloride | 22.9 |
| 83-4 | Trimethyl orthovanadata | 85.8 |
| 83-5 | Vanadyl diacetylacetonate | 50.2 |
| 83-6 | Vanadyl triacetylacetonate | 75.3 |
| 83-7 | Di-tert-butyl monochloro-orthovanadate | 96.4 |
| 83-8 | Tert-butyl dichloro-orthovanadate | 47.4 |
| 83-9 | n-Butoxytitanium | 23.0 |
| 83-10 | Titanium tetrachloride | 19.9 |
| 83-11 | n-Butoxyzirconium | 35.3 |
| 83-12 | Zirconium tetrachloride | 76.7 |
| 83-13 | Dichlorooxyzirconium (octahydrate) | 74.7 |
| 83-14 | Pentaethoxytantalum | 3.2 |
| 83-15 | Zirconium chloranilate | 37.8 |

The obtained copolymers were rubbery elastomers and it was found from elementary analysis that the molar ratio of acrylonitrile and butadiene was 1:1.

EXAMPLE 84

Into a beverage bottle of 100 ml. of capacity were charged 100 mmoles of methyl methacrylate, 100 mmoles of butadiene at —78° C. under nitrogen atmosphere and further charged 2.0 mmoles of ethyl-aluminum dichloride, 0.4 mmole of vanadyl trichloride and 4.0 mmoles of the same zinc chloride/acrylonitrile complex as prepared in Example 67, after which a copolymerization reaction was effected at 0° C. for 20 hours. The obtained copolymer was a rubbery elastomer and the yield was 18.9%. It was found from elementary analysis that the content of methyl methacrylate was 50.7 mol percent and the copolymer was an alternating copolymer composed of methyl methacrylate and butadiene in a ratio of substantially 1:1.

EXAMPLE 85

A copolymerization reaction was effected at 0° C. for 24 hours in the same manner as described in Example 84 except that 300 mmoles of acrylonitrile and 100 mmoles of isoprene were used as monomers. The yield of the resulting copolymer was 48.5% based on the assumption that monomers of acrylonitrile and isoprene were copolymerized in a ratio of 1:1. It was confirmed from elementary analysis that the acrylonitrile content was 48.4 mol percent.

EXAMPLE 86

A copolymerization reaction was effected at 20° C. for 24 hours in the same manner as described in Example 84 except that 300 mmoles of acrylonitrile and 100 mmoles of butadiene were used as monomers. Furthermore, an effect of adding benzoyl peroxide as a peroxide to this polymerization system was examined. The obtained results are shown in the following Table 23.

TABLE 23

| Experimental number | Benzoyl peroxide | Mmol | Yield (percent) | Acrylonitrile content (mo percent) |
|---|---|---|---|---|
| 86-1 | Not added | | 54.2 | 51.5 |
| 86-2 | Added | 2.0 | 87.0 | 53.1 |

It can be seen from Table 23 that the polymerization rate is considerably accelerated by the addition of benzoyl peroxide.

EXAMPLE 87

A glass pressure bottle was deaired, dried and filled with purified nitrogen. Into the bottle were charged 5.3 g. (0.1 mole) of purified and dried acrylonitrile and further 0.5 ml. (0.5 mmole) of 1 mole/l. solution of triethylaluminum in hexane at room temperature. Then, the bottle was cooled to —78° C., charged with 5.4 g. (0.1 mole) of liquid butadiene and 2 ml. (2 mmoles) of 1 mole/l. solution of vanadyl trichloride in hexane and then closed tightly, after which the bottle was left to stand at 0° C. for 15 hours to effect a copolymerization reaction.

The reaction mixture was poured into a large amount of methanol containing a small amount of 2,6-di-tert-butyl-p-cresol to stop the copolymerization reaction and to precipitate a copolymer. The resulting copolymer was dried at room temperature under vacuum to obtain 2.27 g. of a rubbery elastomer. The obtained copolymer was dissolved completely in dimethylformamide, chloroform, tetrahydrofuran, acetonitrile, methyl ethyl ketone and nitrobenzene. The intrinsic viscosity in dimethylformamide at 30° C. was 1.47.

The copolymer was dissolved in deuterochlorform, and NMR spectrum of the copolymer was measured at 60 megacycles. That is, the composition of the copolymer was determined from the ratio of the area of NMR spectrum of the methine proton in butadiene unit to the area of NMR spectrum of the methine proton of acrylonitrile unit and the methylene proton of acrylonitrile unit and butadiene unit. As the result, it was found that the content of acrylonitrile unit was 50.8 mol percent. That is, the resulting copolymer was composed of the same mole amount of butadiene unit and acrylonitrile unit and the composition was 1:1. Furthermore, it was found that the copolymer contained neither homopolymer nor block polymer by checking chemical shifts and had a good stereospecific property from the simplicity and the sharpness of NMR spectrum. The above-mentioned facts obtained by the NMR spectrum show that the copolymer is an alternating copolymer having a good stereospecific property.

A film of the copolymer was formed on a rock salt plate and the IR spectrum of the copolymer was measured. The characteristic absorption band of nitrile group in the acrylonitrile unit and that of trans-1,4 bond in the butadiene unit were observed apparently at 2,240 cm.$^{-1}$ and 973 cm.$^{-1}$ respectively. The characteristic absorption band of 1,2-bond in the butadiene unit was negligible and that of cis-1,4 bond was not substantially observed. The microstructure value measured by Morero's method was 98% of trans-1, bond, 2% of 1,2-bond and ~0% of cis-1,4 bond.

As described above, the obtained copolymer was a high molecular weight rubbery elastic copolymer containing substantially no part insoluble in dimethylformamide, and was a stereospecific alternating copolymer, wherein substantially the whole butadiene units were bonded in trans-1,4 type. According to the elementary analysis, found value of carbon was 78.12%, that of hydrogen 8.79%, and that of nitrogen 13.09%. In the theoretical values of alternating copolymer containing the same moles of butadiene and acrylonitrile, carbon is 78.45%, hydrogen 8.47%, and nitrogen 13.08%, so that the found values agree with the theoretical values well. Furthermore, the nitrogen content showed that the obtained copolymer contained 50.1 mol percent of acrylonitrile unit.

COMPARATIVE EXAMPLE 13

A copolymerization reaction was effected in the same manner as described in Example 87 except that 5.3 g. (0.1 mole) of acrylonitrile, 0.5 mmole of triethylaluminum, 5.4 g. (0.1 mole) of butadiene and 0.25 mmole of vanadyl trichloride were used, but no copolymer was obtained.

COMPARATIVE EXAMPLE 14

A copolymerization reaction was effected in the same manner as described in Example 87, except that 5.3 g. (0.1 mole) of acrylonitrile, 0.5 mole of triethylaluminum, 5.4 g. (0.1 mole) of butadiene and 5 mmoles of vanadyl trichloride were used, to obtain 0.08 g. of a copolymer.

From the comparison of Example 87 with Comparative Examples 13 and 14, it can be seen that a catalyst prepared from component (A) and component (B-4) in a molar ratio of 0.5:1 or 10:1 has substantially no catalytic activity, while a catalyst prepared from component (A) and component (B-4) in a molar ratio of 4:1 as shown in Example 87 has a satisfactory catalytic activity.

EXAMPLE 88-90

A series of experiments were made by varying the amount of vanadyl trichloride used in the same manner as described in Example 87 to obtain a result as shown in the following Table 24. The copolymerization reaction was effected in the following recipe and condition.

Recipe:
- Acrylonitrile _____ 5.3 g. (0.1 mole).
- Butadiene _____ 5.4 g. (0.1 mole).
- Triethylaluminum _____ 0.5 mmole.
- Vanadyl trichloride _____ Varied.
- Polymerization condition _____ 0° C., 15 hours.

TABLE 24

| Example number | Vanadyl trichloride/ triethylaluminum (molar ratio) | Yield (percent) | Intrinsic viscosity ($\eta$) | Acrylonitrile content (mol percent) |
|---|---|---|---|---|
| 88 | 2/1 | 1.47 | 0.81 | 50.7 |
| 89 | 6/1 | 1.02 | 1.47 | 50.3 |
| 90 | 7/1 | 1.00 | 1.29 | 50.4 |

It was confirmed from NMR spectrum, IR spectrum and elementary analysis that the obtained rubbery elastomer was a stereospecific alternating copolymer.

EXAMPLE 91

A polymerization experiment was made in the same manner as described in Example 87 using triisobutylaluminum as a component (B-4). In this case, 5.3 g. (0.1 mole) of acrylonitrile, 5.4 g. (0.1 mole) of butadiene, 1 mmole of triisobutylaluminum and 4 mmoles of vanadyl trichloride were used and a copolymerization reaction was effected at 0° C. for 15 hours. The yield of the obtained rubbery elastomer was 2.11 g. and the intrinsic viscosity was 1.22. The elastomer was dissolved completely in dimethylformamide. Furthermore, it was confirmed from NMR spectrum, IR spectrum and elementary analysis that the resulting copolymer was a stereospecific alternating copolymer.

EXAMPLES 92-93

A polymerization experiment was made by varying the amount of the catalyst used in the same manner as described in Example 87 to obtain a result as shown in the following Table 25. The copolymerization reaction was effected in the following recipe and condition.

Recipe:
- Acrylonitrile _____ 5.3 g. (0.1 mole).
- Butadiene _____ 5.4 g. (0.1 mole).
- Vanadyl trichloride/triethylaluminum _____ Molar ratio, 4/1.
- Polymerization condition _____ 0° C., 15 hours.

TABLE 25

| Example number | Amount of triethylaluminum used (mmol) | Yield (g.) | Intrinsic viscosity ($\eta$) | Acrylonitrile content (mol percent) |
|---|---|---|---|---|
| 92 | 2 | 3.40 | 0.68 | 50.1 |
| 93 | 1 | 2.30 | 1.14 | 51.2 |

The obtained rubbery elastomer was identified with a stereospecific alternating copolymer from NMR spectrum, IR spectrum and elementary analysis, and dissolved completely in dimethylformamide.

COMPARATIVE EXAMPLE 15

A polymerization experiment was made in the same recipe as described in Example 93 except that the catalyst was prepared in the absence of acrylonitrile. That is, 1 mole of triethylaluminum was mixed with 4 mmoles of vanadyl trichloride, and the resulting mixture was added with 5.3 g. (0.1 mole) of acrylonitrile and 5.4 g. (0.1 mole) of butadiene, after which a copolymerization reaction was effected at 0° C. for 15 hours. The yield of the obtained rubbery elastomer was 1.01 g. The elastomer had an intrinsic viscosity of 1.94 and was dissolved completely in dimethylformamide.

From the comparison of this example with Example 93, it can be seen that when component (A) and component (B-4) are mixed in the absence of acrylonitrile, the catalytic activity lowers.

EXAMPLES 94-96

To various amounts of azobisisobutyronitrile, as shown in the following Table 26 were added 15.9 g. (0.3 mole) of acrylonitrile and further 5.4 g. (0.1 mole) of butadiene, and the resulting mixture was added and mixed with 1 mmole of vanadyl trichloride and 0.5 mmole of triethylaluminum, after which a copolymerization reaction was effected at 80° C. for 3 hours. The amount of azobisisobutyronitrile used and the obtained result are shown in the following Table 26.

TABLE 26

| Example number | Amount of azobisisobutyro- nitrile (mmol) | Yield (g.) | Intrinsic viscosity ($\eta$) | Acrylonitrile content (mol percent) |
|---|---|---|---|---|
| 94 | 0.25 | 3.53 | 0.35 | 50.2 |
| 95 | 0.50 | 5.61 | 0.29 | 50.3 |
| 96 | 0 | 0.50 | | 50.1 |

It was confirmed from NMR spectrum, IR spectrum and elementary analysis that the obtained rubbery elastomer was a stereospecific alternating copolymer.

EXAMPLES 97-98

These examples show copolymerizations of acrylonitrile, butadiene and n-butyl acrylate.

To 0.25 mmole of azobisisobutyronitrile were added predetermined amounts of acrylonitrile and n-butyl acrylate, 5.4 g. (0.1 mole) of butadiene, 0.5 mmole of triethylaluminum and 1.0 mmole of vanadyl trichloride, after which a polymerization reaction was effected at 80° C. for 3 hours. The amounts of conjugated polar vinyl monomers used and the yield are shown in the following Table 27.

TABLE 27

| Example number | Amount of conjugated polar vinyl monomers used (mol) | | Yield (percent) |
|---|---|---|---|
| | Acrylo- nitrile | n-Butyl acrylate | |
| 97 | 0.09 | 0.01 | 9.6 |
| 98 | 0.08 | 0.02 | 14.6 |

It was confirmed from NMR spectrum, IR spectrum and elementary analysis that the resulting copolymer contained copolymerized n-butyl acrylate and was a copolymer having a molar ratio of acceptor monomer unit (acrylonitrile and n-butyl acrylate) to donor monomer unit (butadiene) of 1:1.

EXAMPLE 99

B—B fraction obtained from naphtha cracking process was passed through a drying tower of molecular sieve, cooled to —78° C. and collected. According to gas chromatography, the composition of the B—B fraction was as follows:

| | Wt. percent |
|---|---|
| $C_3$-fraction, such as propane, propylene | 1.9 |
| Isobutane | 1.2 |
| n-Butane | 6.5 |
| Butene-1 | 16.0 |
| Isobutylene | 29.0 |
| Trans-butene-2 | 5.8 |
| Cis-butene-2 | 3.7 |
| 1,3-butadiene | 35.4 |
| $C_5$-fraction, such as pentane | 0.5 |

Into a beverage bottle of 100 ml. capacity were charged 100 mmoles of purified acrylonitrile under nitrogen atmosphere, and cooled to −78° C. The bottle was charged with 2.0 mmoles of triethylaluminum, 4.0 mmoles of vanadyl trichloride and further 15.3 g. of the B—B fraction, and was closed tightly, after which a copolymerization reaction was effected at 0° C. for 24 hours. A rubbery elastomer containing no gel was obtained in a yield of 3.01 g. Elementary analysis showed that the nitrogen content was 12.98% and agreed with the theoretical value (N: 13.07%) of the copolymer, in which acrylonitrile and butadiene were copolymerized in a ratio of substantially 1:1. It was found from IR spectrum that the copolymer contained a small amount of olefin unit in addition to butadiene and acrylonitrile.

Moreover, a polymerization reaction was effected by adding 4.2 mmole of azobisisobutyronitrile to the same polymerization system as described above at 40° C. for 3 hours. The yield of the obtained copolymer was 3.44 g. and the analytical result of the copolymer was substantially the same as that of the system containing no azobisisobutyronitrile.

EXAMPLE 100

Into a beverage bottle of 100 ml. capacity were charged 100 mmoles of methyl methacrylate and 100 mmoles of butadiene at −78° C. under nitrogen atmosphere and further 1.0 mmole of triethylaluminum and 4.0 mmoles of vanadyl trichloride, after which the bottle was closed tightly and a copolymerization reaction was effected at 0° C. for 20 hours. The obtained copolymer was a rubbery elastomer containing no gel and the yield was 16.8%. It was found from elementary analysis that the copolymer contained 49.9 mol percent of methyl methacrylate.

EXAMPLE 101

Into a beverage bottle of 100 ml. capacity were charged 200 mmoles of acrylonitrile and 100 mmoles of butadiene at −78° C. under nitrogen atmosphere and further charged 0.9 mmole (in aluminum metal base) of a reaction product of triethylaluminum and aluminum chloride in a molar ratio of 1:1, 2.1 mmoles of a zinc chloride/acrylonitrile complex and 0.015 mmole of vanadyl trichloride, after which the bottle was closed tightly and a copolymerization reaction was effected at 20° C. for 24 hours. The obtained copolymer was a rubbery elastomer and the yield was 48.1%. Elementary analysis showed that the copolymer contained 49.5 mol percent of acrylonitrile, and NMR spectrum showed that the copolymer was an alternating copolymer.

What is claimed is:

1. A method of producing alternating copolymers of conjugated dienes and conjugated polar vinyl monomers, which comprises copolymerizing at least one monomer selected from conjugated dienes having 4 to 10 carbon atoms and at least one conjugated polar vinyl monomer selected from the group consisting of acrylonitrile, methacrylonitrile, methyl acrylate, ethyl acrylate, propyl acrylate, butyl acrylate and methyl methacrylate at a temperature of −78° to 100° C. in a non-aqueous liquid medium in the presence of a catalyst prepared in the presence of a conjugated polar vinyl monomer to be used in the copolymerization reaction from any one of the combinations of (A)–(B–1)–(C), (A)–(B–2), (A)–(B–2)–(C), (A)–(B–3), (A)–(B–3)–(C), (A)–(B–4) and (A–(B–4)–(C) of the following catalyst components a component (A): at least one transition metal compound selected from compounds of transition metals of the Groups IVb and Vb in the Periodic Table, and a component (B): at least one component selected from the following groups (B–1): an aluminum-containing component selected from the group consisting of aluminum compounds having the general formulae $AlR_2X$, $Al_2R_3X_3$ and $AlRX_2$ and a combination of two or more aluminum compounds having the general formulae $AlR_2X$, $Al_2R_3X_3$, $AlRX_2$, $AlR_3$ and $AlX_3$ wherein R represents a hydrocarbon radical selected from the group consisting of alkyl, cycloalkyl, aryl, alkaryl, and aralkyl radicals having 1 to 20 carbon atoms and X represents a halogen radical selected from the group consisting of F, Cl, Br and I radicals, in said aluminum-containing component a ratio ($d$) of the total number of the hydrocarbon radicals to the total number of halogen radicals satisfying the following requirement $$0 < d \leq 2.0 \tag{1}$$

and R and X in the aluminum compounds constituting said component (B–1) may be same or different, (B–2): a combination of (B–2–$a$) at least one compound selected from the group consisting of aluminum compound having the general formula $AlR_mX_{3-m}$ and (B–2–$b$) at least one compound selected from the group consisting of tin compounds having the general formula $SnR'_{m'} \cdot X_{4-m'}$, wherein R and R' represent a hydrocarbon radical having 1 to 20 carbon atoms, X represents a halogen radical, $m$ is a number selected from the group consisting of 1.5, 2.0 and 3.0 and $m'$ is a number selected from the group consisting of 0, 1, 2, and 3, (B–3): a combination of (B–3–$a$) at least one compound selected from the group consisting of organometallic compounds having the general formulae $R_n M^I$ and $R_{n'-n''} \cdot M^{II} X_{n''}$ and (B–3–$b$) at least one compound selected from the group consisting of metal halides having the general formula $M^{III} X_p$ wherein R represents a hydrocarbon radical having 1 to 20 carbon atoms, X represents a halogen radical, $M^I$ represents one metal selected from the group consisting of beryllium, magnesium, zinc, cadmium, mercury, boron, aluminum, and gallium, $M^{II}$ represents one metal selected from the group consisting of magnesium, cadmium, mercury, boron, aluminum, and gallium, $M^{III}$ represents one metal selected from the group consisting of beryllium, magnesium, calcium, zinc, cadmium, mercury, boron, aluminum, gallium, strontium and barium, $n$ represents the valence of $M^I$, $n'$ represents the valence of $M^{II}$, $n''$ represents the integer minor than $n'$ and $p$ represents the valence of $M^{III}$, all of $M^I$, $M^{II}$ and $M^{III}$ in the combination being not aluminum at the same time, and (B–4): an organoaluminum compound selected from the group consisting of aluminum compounds having the general formula $AlR_3$, wherein R represents a hydrocarbon radical having 1 to 10 carbon atoms, provided that in the case of the combination of the component (A) with the component (B–4), the component (A) is limited to vanadyl trichloride, and a component (C): at least one radical initiator selected from the group consisting of organic peroxides, azonitrile compounds and trialkylboron-oxygen systems, the transition metal atom in the component (A) being $10^{-6}$ to 2 g.-atom based on 1 g.-atom in the component (B–1), being $10^{-4}$ to 10 g.-atom based on 1 g.-atom of the total metal atom in the component (B–2), being $10^{-3}$ to 2 g.-atom based on 1 g.-atom of the total metal atom in the component (B-3) and being 1 to 7 g.-atom based on 1 g.-atom of the metal atom in the component (B-4), the total amount of the metal atoms in the catalyst system being $10^{-5}$ to 0.5 g.-atom based on 1 mole of the fed monomers, the total amount of the component (C) being 0.005 to 5 mol percent based on the total amount of the monomers, and the molar ratio of the total amount of the conjugated dienes to the total amount of the conjugated polar vinyl monomers being 1/10 to 10/1, the tin atom in the tin compound of (B-2-$b$) being 50 to 0.02 g.-atoms based on 1 g.-atom of aluminum atom in the aluminum compound of (B-2-$a$) and the metal atom in the metal halide of (B-3-$b$) being 0.2 to 1,000 g.-atom based on the metal atom in the organometallic compound of (B-3-$a$).

2. The method as claimed in claim 1, wherein the monomers are copolymerized in the presence of the catalyst system and in the additional presence of at least one molecular weight regulator selected from the group consisting of mercaptans, disulfide compounds, carbon tetrabromide, trichloromonobromomethane, bromoform, iodoform and carbon tetraiodide, the molar ratio of the total amount of the molecular weight regulator to the fed monomers being from $10^{-8}$:1 to 1.05:1.

3. The method as claimed in claim 1, wherein said conjugated diene is butadiene.

4. The method as claimed in claim 1, wherein said conjugated polar vinyl monomer is acrylonitrile.

5. The method as claimed in claim 1, wherein said component (A) is vanadium compound.

6. The method as claimed in claim 5, wherein said vanadium compound is vanadyl trichloride.

7. The method as claimed in claim 5, wherein said vanadium compound is tri-tert-butyl orthovanadate.

8. The method as claimed in claim 1, wherein said component (B-1) is ethylaluminum dichloride.

9. The method as claimed in claim 1, wherein said component (B-1) is a combination of triethylaluminum and aluminum trichloride.

10. The method as claimed in claim 1, wherein said component (B-2) is a combination of triethylaluminum and stannic chloride.

11. The method as claimed in claim 1, wherein said component (B-2) is a combination of triethylaluminum and triethyltin monochloride.

12. The method as claimed in claim 1, wherein said component (B-3) is a combination of ethylaluminum dichloride and zinc chloride.

13. The method as claimed in claim 1, wherein said component (B-3) is a combination of triethylaluminum and zinc chloride.

14. The method as claimed in claim 1, wherein said component (B-3) is a combination of diethylzinc and zinc chloride.

15. The method as claimed in claim 1, wherein said component (B-3) is a combination of diethylzinc and aluminum trichloride.

16. The method as claimed in claim 1, wherein said component (B-3) is a combination of triethylaluminum, aluminum trichloride and zinc chloride.

17. The method as claimed in claim 1, wherein said component (B-4) is triethylaluminum.

18. The method as claimed in claim 1, wherein butadiene and acrylonitrile are copolymerized.

19. The method as claimed in claim 1, wherein butadiene and methyl methacrylate are copolymerized.

20. The method as claimed in claim 1, wherein isoprene and acrylonitrile are copolymerized.

21. The method as claimed in claim 1, wherein butadiene, acrylonitrile and n-butyl acrylate are terpolymerized.

22. The method as claimed in claim 1, wherein said organic peroxide is benzoyl peroxide.

23. The method as claimed in claim 1, wherein said organic peroxide is diisopropyl peroxydicarbonate.

24. The method as claimed in claim 1, wherein said azonitrile compound is azobisisobutyronitrile.

25. The method as claimed in claim 1, wherein said trialkylboron is triethylboron.

26. The method as claimed in claim 2, wherein said mercaptan is n-dodecylmercaptan.

27. The method as claimed in claim 2, wherein said disulfide is tert-butyl disulfide.

28. The method as claimed in claim 1, wherein said catalyst is ethylaluminum dichloride-vanadyl trichloride-benzoyl peroxide.

29. The method as claimed in claim 1, wherein said catalyst is ethylaluminum dichloride-vanadyl trichloride-azobisisobutyronitrile.

30. The method as claimed in claim 1, wherein said catalyst is triethylaluminum-stannic chloride-vanadyl trichloride.

31. The method as claimed in claim 1, wherein said catalyst is triethylaluminum-zinc chloride-vanadyl trichloride.

32. The method as claimed in claim 1, wherein said catalyst is ethylaluminum dichloride-zinc chloride-vanadyl trichloride.

33. The method as claimed in claim 1, wherein said catalyst is triethylaluminum-aluminum trichloride-zinc chloride-vanadyl trichloride.

34. The method as claimed in claim 1, wherein said catalyst is triethylaluminum-vanadyl trichloride.

References Cited

UNITED STATES PATENTS

| | | | |
|---|---|---|---|
| 2,910,461 | 10/1959 | Nowlin et al. | 260—94.9 |
| 3,024,227 | 3/1962 | Nowlin et al. | 260—94.9 |
| 3,152,089 | 10/1964 | Nowlin et al. | 252—429 |
| 3,272,786 | 9/1966 | Perry | 260—88.7 |
| 3,275,611 | 9/1966 | Mottus et al. | 260—80.5 |
| 3,365,432 | 1/1968 | MacKenzie et al. | 260—82.5 |
| 3,647,753 | 3/1972 | Nakaguchi et al. | 260—63 R |
| 3,658,775 | 4/1972 | Kawasaki et al. | 260—82.5 |
| 3,700,637 | 10/1972 | Finch | 260—83.3 |

STANFORD M. LEVIN, Primary Examiner

U.S. Cl. X.R.

260—32.6, 32.8 A, 33.8 UA, 82.5, 83.5